(12) United States Patent
Ito et al.

(10) Patent No.: US 6,310,787 B2
(45) Date of Patent: Oct. 30, 2001

(54) MULTIWAY POWER CONVERTER

(75) Inventors: Youichi Ito, Kawagoe; Sinji Sato, Fujimi; Yasuhiro Nakajima; Toshihiko Watanabe, both of Kawagoe, all of (JP)

(73) Assignee: Sanken Electric Co., Ltd., Saitama-Ken (JP)

(*) Notice: Subject to any disclaimer, the term of this patent is extended or adjusted under 35 U.S.C. 154(b) by 0 days.

(21) Appl. No.: 09/820,469

(22) Filed: Mar. 29, 2001

(30) Foreign Application Priority Data

Apr. 3, 2000 (JP) .................................................. 12-101500

(51) Int. Cl.[7] ...................................................... H02J 3/00
(52) U.S. Cl. .................. 363/34; 363/17; 363/98
(58) Field of Search .................. 363/16, 17, 97, 363/98, 131, 132, 34, 37

(56) References Cited

U.S. PATENT DOCUMENTS

| 5,291,384 | * | 3/1994 | Mammano | 363/17 |
| 5,592,368 | * | 1/1997 | Bidaud et al. | 363/34 |
| 5,949,668 | * | 9/1999 | Schweighofer | 363/98 X |

FOREIGN PATENT DOCUMENTS

08126352 A   5/1996   (JP) .

* cited by examiner

*Primary Examiner*—Jessica Han
(74) *Attorney, Agent, or Firm*—Woodcock Washburn Kurtz Mackiewicz & Norris LLP

(57) ABSTRACT

A switching power converter capable of operation in either Nonconversion, Stepdown, or Stepup Mode. Included is a parallel circuit of three serial connections of a first, a second and a third pair of switches. The junction between the first pair of switches is connected to an a.c. input terminal via an inductor, the junction between the second switch pair grounded, and the junction between the third switch pair connected to an a.c. output terminal via another inductor. The first and third switch pairs are driven at the frequency (e.g. 50 Hz) of an a.c. input voltage, and the second switch pair at a higher frequency (e.g. 20 kHz), in Nonconversion Mode; the first switch pair at the low frequency, and the second and third switch pairs at the high frequency, in Stepdown Mode; and the first and second switch pairs at the high frequency, and the third switch pair at low frequency, in Stepup Mode. The second switch pair is invariably driven at the high frequency.

14 Claims, 14 Drawing Sheets

MULTIWAY POWER CONVERTER

BACKGROUND OF THE INVENTION

This invention relates to electric power converters in general and, in particular, to a single- or multi-phase power converter capable of conversion from one alternating voltage to another in more ways than one; that is, the output voltage may be either equal to, or higher or lower than, the input voltage.

The a.c.-to-d.c.-to-a.c. power converter has been known which is constituted of a half-bridge a.c.-to-d.c. converter and a half-bridge d.c.-to-a.c. inverter. How to improve the efficiency of this type of power converter has also been known, as described and claimed by Japanese Unexamined Patent Publication No. 8-126352 filed by the assignee of the instant application. It suggests use of a high switching frequency, a frequency much higher than that of the input voltage, only for some of the switches included in the a.c.-to-d.c.-to-a.c. converter, and actuation of the other switches at the input voltage frequency for rectification purposes, rather than driving all the switches of the a.c.-to-d.c. converter and d.c.-to-a.c. inverter at the high frequency.

The noted prior art a.c.-to-d.c.-to-a.c. converter is capable of operation in either of three different modes depending upon the way the switches are controlled: (a) Nonconversion Mode in which the output voltage is approximately equal to the input; (b) Stepdown Mode in which the output is lower than the input; and (c) Stepup Mode in which the output is higher than the input. Such a multiway power converter can, in effect, transform one a.c. input voltage into several different a.c. output voltages, or several different a.c. input voltages into one a.c. output voltage.

Although the prior art device succeeds in reduction of switching frequencies, it has some offsetting drawbacks. Its power factor and current waveforms are still unsatisfactory. Additionally, it has very complex circuitry, with too many switches, in order to provide for selective operation in the three different modes.

SUMMARY OF THE INVENTION

It is therefore an object of this invention to improve the power factor of a multiway power converter of the kind defined.

Another object of the invention is to simplify the circuit configuration of a multiway power converter of the kind defined.

Briefly, the invention may be summarized as a multiway power converter for converting an alternating input voltage from a power supply, connected between a first and a second input terminal, into two or more different alternating output voltages to be applied to a load connected between a first and a second output terminal. Included are a serial connection of a first and a second switch, with a junction therebetween connected to the first input terminal, another serial connection of a third and a fourth switch with a junction therebetween connected to interconnected second input terminal and second output terminal, and still another serial connection of a fifth and a sixth switch with a junction therebetween connected to the first output terminal. All the three serial switch connections are connected in parallel with one another. At least two inductors are connected in positions selected from among a first position between the first input terminal and the junction between the first and the second switch, a second position between the first output terminal and the junction between the fifth and the sixth switch, and a third position between the interconnected second input terminal and second output terminal and the junction between the third and the fourth switch.

Also included is a control circuit comprising at least any two of: (a) first control means for making on-off control of the first and the second and the fifth and the sixth switch at the frequency of the input voltage, and of the third and the fourth switch at a frequency higher than that of the input voltage, in Nonconversion Mode in which a first voltage between the first input terminal or the junction between the first and the second switch and the interconnected second input terminal and second output terminal is approximately equal to a second voltage between the first output terminal or the junction between the fifth and the sixth switch and the interconnected second input terminal and second output terminal; (b) second control means for making on-off control of the first and the second switch at the frequency of the input voltage, and of the third and the fourth and the fifth and the sixth switch at a frequency higher than that of the input voltage, in Stepdown Mode in which the second voltage is lower than the first voltage; and (c) third control means for making on-off control of the first and the second and the third and the fourth switch at a frequency higher than that of the input voltage, and of the fifth and the sixth switch at the frequency of the input voltage, in Stepup Mode in which the second output voltage is higher than the first voltage.

Thus, in each mode, one or two serially interconnected pairs of switches are driven at the input voltage frequency for less switchings per unit length of time and, in consequence, for less switching loss. It may also have been noted that the third and fourth switches are invariably operated at the high frequency in all the modes, affording improvement in power factor in each mode.

Preferably, for controlling the three pairs of switches as outlined above, there can be employed a rectangular wave generator connected to the pair of input terminals for generating a rectangular wave voltage at the same frequency as the input voltage. The rectangular wave voltage can be utilized for driving the one or two pairs of switches at the input voltage frequency in each mode, instead of at the high frequency. The rectangular wave generator and associated means for prevention of the high-frequency driving of the required switch pair or pairs are recommended for their simplicity in construction and reliability in operation.

In a preferred embodiment of the invention to be disclosed subsequently, the converter is so constructed as to provide a constant output voltage in the face of changes in input voltage, or several different output voltages from an unvarying input voltage. Either way, however, the converter operation in each case may be described as either Nonconversion, Stepdown, or Stepup Mode.

The above and other objects, features and advantages of this invention will become more apparent, and the invention itself will best be understood, from a study of the following description and appended claims, with reference had to the attached drawings showing some preferred embodiments of the invention.

DESCRIPTION OF THE PREFERRED EMBODIMENTS

General

Figure 1:
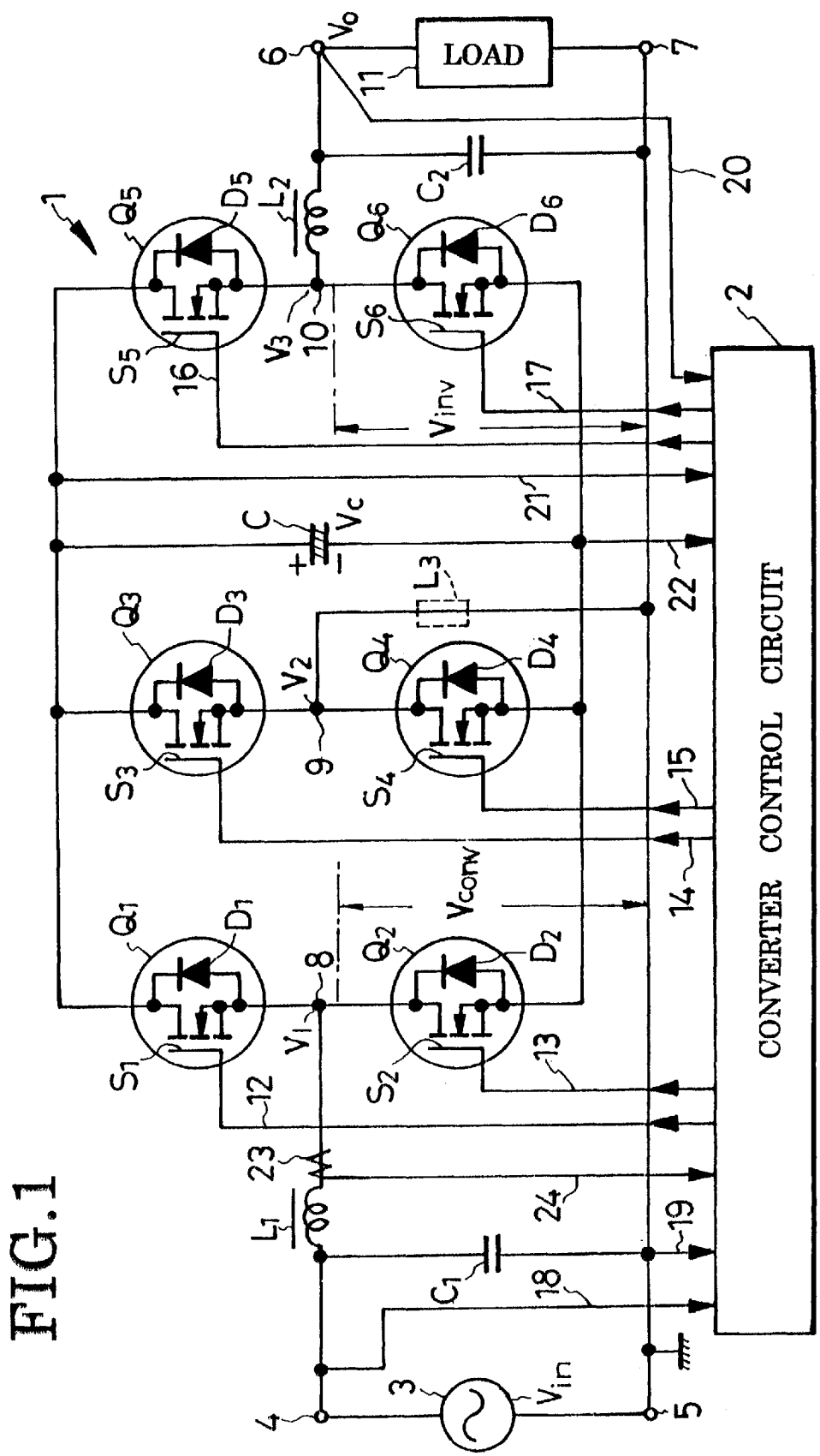
FIG. 1 is a schematic electrical diagram of a power converter circuit shown together with a converter control circuit in block form, the power converter circuit and the converter control circuit constituting in combination the multiway power converter embodying the novel concepts of this invention.
Figure 2:
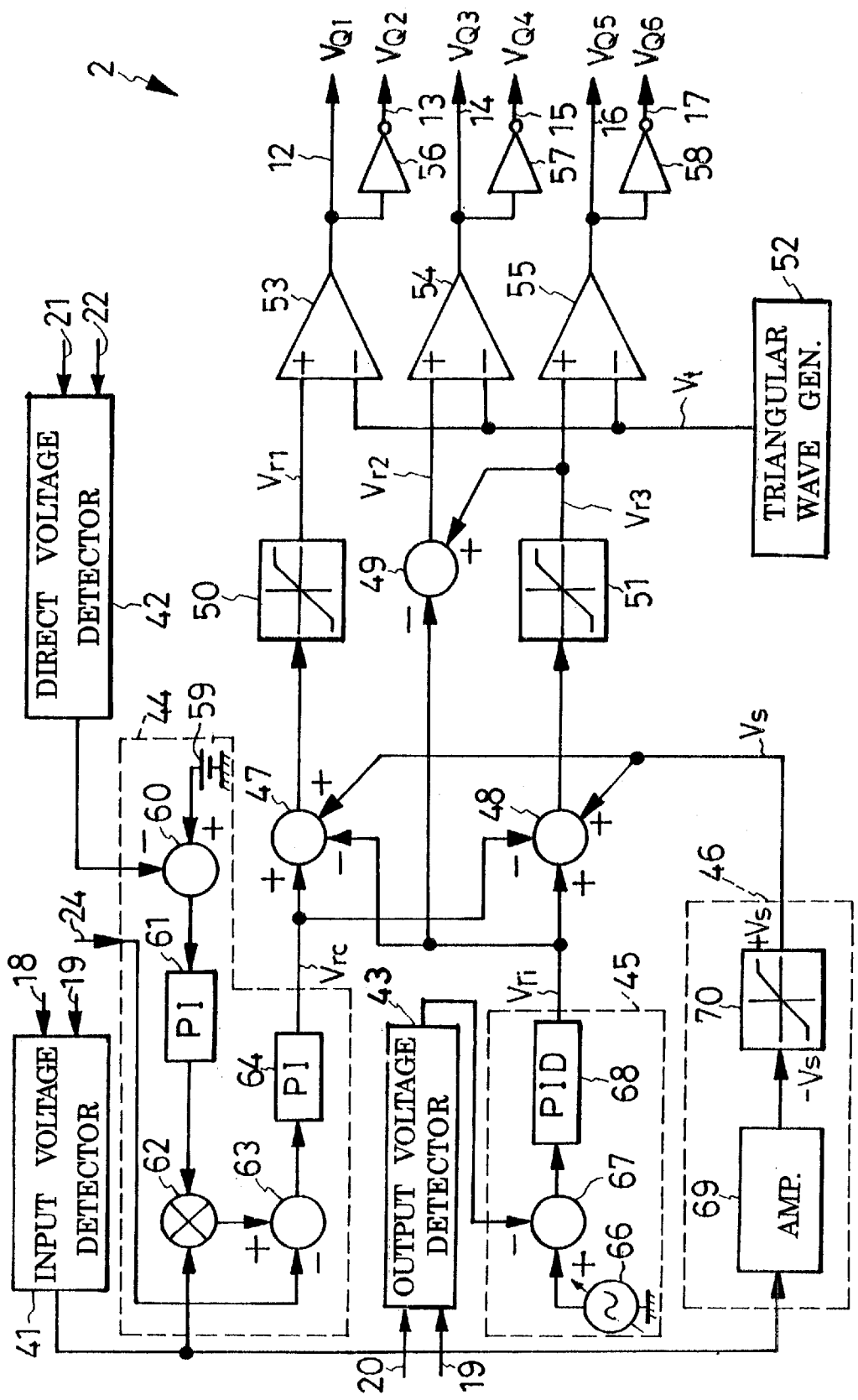
FIG. 2 is a schematic electrical diagram, partly in block form, of the converter control circuit of the FIG. 1 power converter.

The invention will now be described in detail as embodied in several preferred forms of switching multiway power converters or voltage regulators with improved power factors. FIGS. 1 and 2 are both directed to the first of such preferred forms, which is broadly divisible into a power converter circuit 1 shown in detail in FIG. 1 and a converter control circuit 2 shown in block form in FIG. 1 and in detail in FIG. 2. As the names imply, the power converter circuit 1 deals with actual power conversion, and the converter control circuit 2 controls the power converter circuit.

Power Converter Circuit

With reference to FIG. 1 the power converter circuit 1 is shown with a commercial a.c. power supply 3, with a frequency of 50 Hz for instance, connected between its pair of a.c. input terminals 4 and 5, and with a load 11 connected between its pair of output terminals 6 and 7. The input terminal 5 and the output terminal 7 are interconnected and grounded.

Among the primary components of the power converter circuit 1 are six controllable electronic switches $Q_1$, $Q_2$, $Q_3$, $Q_4$, $Q_5$ and $Q_6$, a smoothing capacitor C in the form of an electrolytic capacitor with poles, which may also be called a d.c. capacitor or d.c. link capacitor, an input-stage reactor or inductor $L_1$, an output stage reactor or inductor $L_2$ for filtration, an input-stage capacitor $C_1$ for filtration, and an output-stage capacitor $C_2$ for filtration.

The six electronic switches $Q_1$–$Q_6$ are all shown as metal oxide semiconductor field-effect transistors (MOS FETs) each in the form of an inversely parallel connection of a switching FET $S_1$, $S_2$, $S_3$, $S_4$, $S_5$ or $S_6$ and a diode $D_1$, $D_2$, $D_3$, $D_4$, $D_5$ or $D_6$. These diodes $D_1$–$D_6$ could, however, be discrete parts, not built into the switches $Q_1$–$Q_6$, and the FETs $S_1$–$S_6$ other types of semiconductor switches such as bipolar transistors or insulated-gate bipolar transistors.

The first and second switches $Q_1$ and $Q_2$ are interconnected in series, and so are the third and fourth switches $Q_3$ and $Q_4$, and the fifth and sixth switches $Q_5$ and $Q_6$. These three serial circuits of switches, and the d.c. capacitor C too, are all interconnected in parallel with one another. The junction 8 between the first and second switches $Q_1$ and $Q_2$ is connected to the a.c. input terminal 4 via the first inductor $L_1$. The junction 9 between the third and fourth switches $Q_3$ and $Q_4$ is connected to the grounded input terminal 5. The junction 10 between the fifth and sixth switches $Q_5$ and $Q_6$ is connected to the a.c. output terminal 6 via the second inductor $L_2$.

The two capacitors $C_1$ and $C_2$ are both low-pass filters, the capacitor $C_1$ being connected between the pair of input terminals 4 and 5 for attenuation of incoming currents above a predetermined cutoff frequency. The other capacitor $C_2$ is connected between the pair of output terminals 6 and 7 for elimination of frequencies above a prescribed cutoff frequency from the voltage output.

The first inductor $L_1$ is intended both for production of the output voltage $V_o$ that is higher than the input voltage $V_{in}$ and for improvement of the current waveform and the power factor at the input. The illustrated placement of the first inductor between the input terminal 4 and the junction 8 between the third and fourth switches $Q_3$ and $Q_4$ is not an absolute requirement for attainment of these objectives. Alternatively, one or more inductors could be inserted anywhere between the a.c. power supply 3 and the switch junction 9. For instance, as indicated by the phantom block designated $L_3$ in FIG. 1, an inductor might be connected between the grounded input terminal 5 and the junction 9 between the third and fourth switches $Q_3$ and $Q_4$. As an additional alternative, two inductors might be connected between the junction 8 between the first and second switches $Q_1$ and $Q_2$ and the junction 9 between the third and fourth switches $Q_3$ and $Q_4$, one in serial relationship to the first and third switches, and the other in serial relationship to the second and fourth switches. It is also possible to provide such an alternative inductor or inductors in addition to the illustrated inductor $L_1$.

The six MOS FET switches $Q_1$–$Q_6$ all have their gates connected to the converter control circuit 2 by way of lines 12, 13, 14, 15, 16 and 17, respectively, in order to be controlled thereby. It is understood that these switches are conventionally controlled by application of control signals between their gate and source. FIG. 1 does not, however, show the switch driver circuits for simplicity.

The converter control circuit 2 has inputs connected to the input terminals 4 and 5 via respective conductors 18 and 19, to the output terminal 6 via a conductor 20, to the opposite polarity terminals of the smoothing capacitor C via respective conductors 21 and 22, and to a current detector 23 via a conductor 24. In response to all these inputs the converter control circuit 2 produces control signals for the switches $Q_1$–$Q_6$. The current detector 23 is for detection of the current flowing through the input terminal 4.

Operation of Power Converter Circuit

Configured as above, the power converter circuit 1 is capable of operation in either of the following three modes:

Nonconversion Mode: The output voltage $V_o$ is approximately equal to the input voltage $V_{in}$ (e.g. 100 V).

Stepdown Mode: The output voltage $V_o$ is less than the input voltage $V_{in}$.

Stepup Mode: The output voltage $V_o$ is higher than the input voltage $V_{in}$.

The power converter circuit 1 is to operate in either of the foregoing three modes depending upon the relative magnitudes of mode determinant voltages or commands $V_{rc}$ and $V_{ri}$, FIG. 2, as will be detailed in conjunction with the converter control circuit 2. The first command $V_{rc}$, hereinafter referred to as the input-stage or converter voltage command, is in proportion with the input voltage $V_{in}$ or with the voltage $V_{conv}$ between the grounded input terminal 5 and the junction 8 between the first and second switches $Q_1$ and $Q_2$. The second command $V_{ri}$, hereinafter referred to as the output-stage or inverter voltage command, is in proportion with the output voltage $V_o$ or with the voltage $V_{inv}$ between the grounded terminal 5 or 7 and the junction 10 between the fifth and sixth switches $Q_5$ and $Q_6$. The power converter circuit 1 is in Nonconversion Mode when the two mode determinants $V_{conv}$ and $V_{inv}$ are equal, in Stepdown Mode when $V_{conv}$ is higher than $V_{inv}$, and in Stepup Mode when $V_{conv}$ is less than $V_{inv}$.

In any of the three modes either or both of the input-stage switching circuit, comprising the first and second switches $Q_1$ and $Q_2$, and the output-stage switching circuit, comprising the fifth and sixth switches $Q_5$ and $Q_6$, are prevented from operation at high switching frequencies (e.g. 20 kHz). Power loss is thus avoided at either or both of the input- and output-stage switching circuits.

Nonconversion Mode

Figure 3:
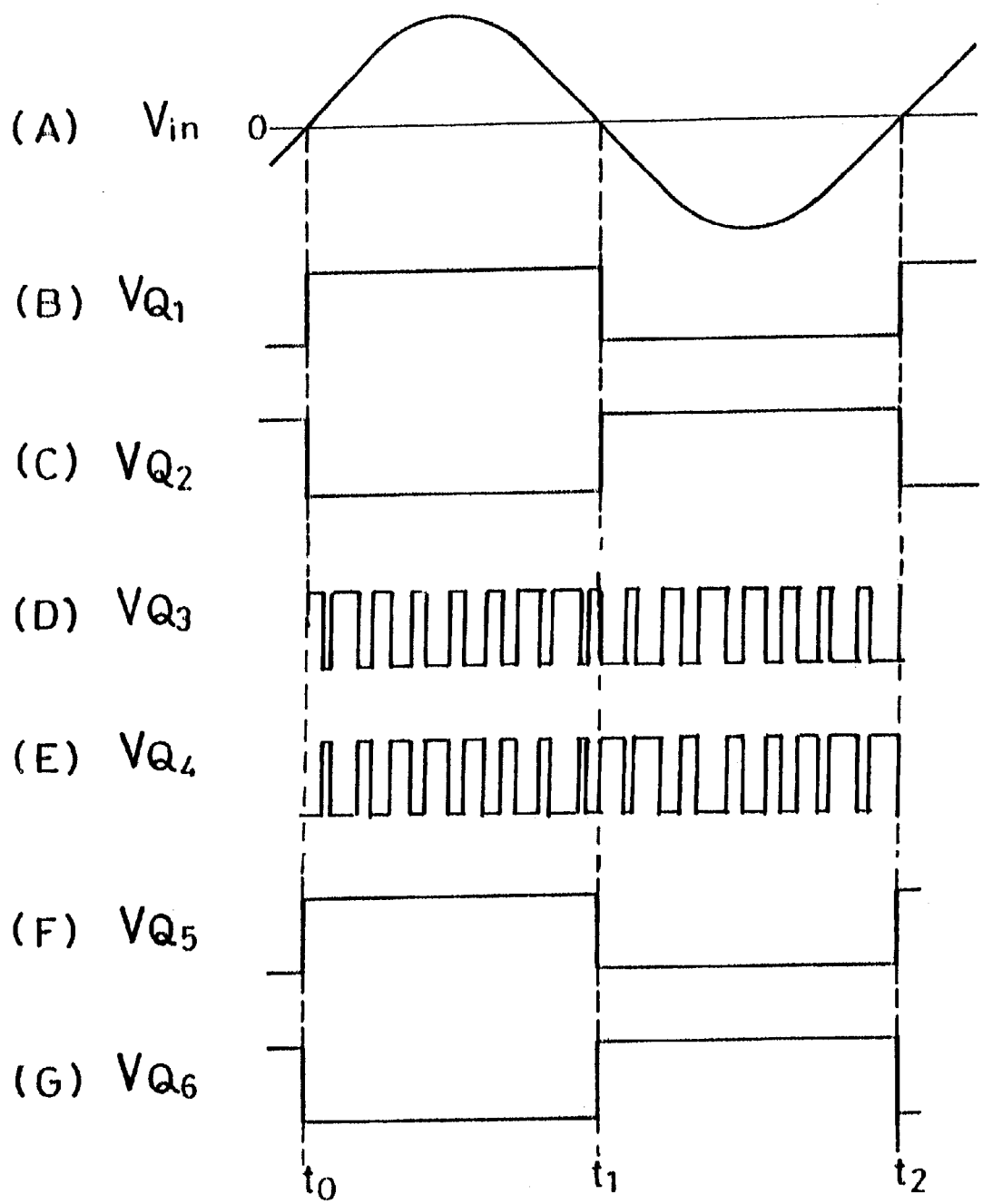
FIG. 3, consisting of (A) through (G), is a series of waveform diagrams explanatory of how the six switches of the FIG. 1 converter are driven in response to the input voltage in Nonconversion Mode.

At (A) in FIG. 3 is shown the sinusoidal waveform of the a.c. input voltage $V_{in}$, with a frequency of 50 Hz, that is now assumed to be applied between the input terminals 4 and 5 of the power converter circuit 1. FIG. 3 further shows at (B)–(G) the six switch control signals $V_{Q1}$–$V_{Q6}$ that will be applied in response to the input voltage $V_{in}$ from the converter control circuit 2 to the six switches $Q_1$–$Q_6$, respectively, of the power converter circuit 1 for converter operation in Nonconversion Mode.

As will become apparent from a closer study of the FIG. 3 waveform diagrams, both first and fifth switches $Q_1$ and $Q_5$ will then be regularly turned on and off at intervals of 180 degrees by the rectangular pulses of the same repetition rate as the frequency of the input voltage $V_{in}$. The second and sixth switches $Q_2$ and $Q_6$ will be turned on and off at the same regular intervals as the switches $Q_1$ and $Q_5$ but in opposite phase relationship thereto. The third and fourth switches $Q_3$ and $Q_4$ will be turned on and off by the rectangular pulses of a repetition rate (e.g. 20 kHz) that is higher than the input voltage frequency.

Incidentally, according to Japanese Unexamined Patent Publication No. 8-1126352, supra, the equivalents to the third and fourth switches $Q_3$ and $Q_4$ are off in Nonconversion Mode. In contrast, in this embodiment of the invention, the switches $Q_3$ and $Q_4$ are driven at a high frequency with a view to the improvement of the power factor and of the input current waveform.

With the switches $Q_1$–$Q_6$ controlled as shown in FIG. 3, a positive-going current will flow from a.c. power supply 3 to load 11 through a circuit comprising the first inductor $L_1$, first switch $Q_1$, fifth switch $Q_5$, and second inductor $L_2$ during each positive half-cycle, as from $t_0$ to $t_1$ in FIG. 3, of the input voltage $V_{in}$. During each negative half-cycle, as from $t_1$ to $t_2$, of the input voltage $V_{in}$, on the other hand, a negative-going current will flow through a circuit comprising the a.c. power supply 3, load 11, second inductor $L_2$, sixth switch $Q_6$, second switch $Q_2$, and first inductor $L_1$.

It will be appreciated that only the two switches $Q_3$ and $Q_4$ are driven at 20 kHz, and the other four switches $Q_1$, $Q_2$, $Q_5$ and $Q_6$ at 50 Hz, during operation in Nonconversion Mode. With these latter switches thus turned on and off a reduced number of times per unit length of time, power loss through switching is reduced to a minimum.

Driven at the higher frequency, the switches $Q_3$ and $Q_4$ contribute as follows to the improvement of the power factor and the current waveform. A current will flow through a path comprising the power supply 3, first inductor $L_1$, first switch $Q_1$, and third switch $Q_3$ when the third switch $Q_3$ is on during each positive half-cycle of the input voltage $V_{in}$. The input current is therefore adjustable through control of the third switch $Q_3$ for improvement of the power factor and the current waveform, the latter objective being tantamount to the elimination of higher harmonics. A current will flow through a path comprising the power supply 3, fourth switch $Q_4$, second switch $Q_2$, and first inductor $L_1$ when the fourth switch is on during each negative half-cycle of the input voltage $V_{in}$. An adjustment of the input current will be made through control of the fourth switch $Q_4$, too, for improvement of the power factor and the current waveform. A sinusoidal current will thus be obtained.

Stepdown Mode

Figure 4:
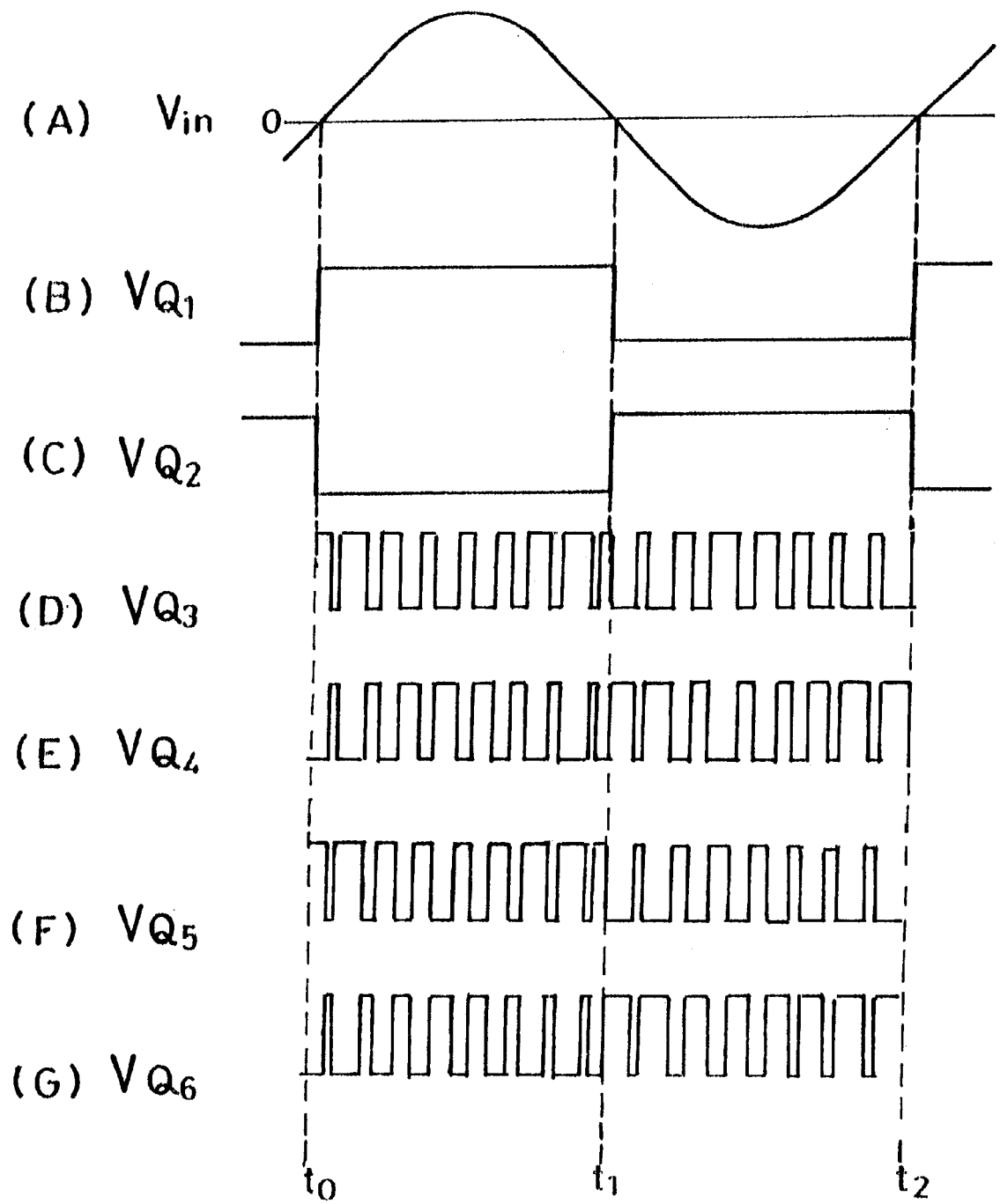
FIG. 4, consisting of (A) through (G), is a series of waveform diagrams explanatory of how the six switches of the FIG. 1 converter are driven in response to the input voltage in Stepdown Mode.

FIG. 4 indicates at (B)–(G) the switch control signals $V_{Q1}$–$V_{Q6}$ which are applied respectively to the switches $Q_1$–$Q_6$ in Stepdown Mode. In response to these switch control signals, as will be apparent from their waveforms, the first and second switches $Q_1$ and $Q_2$ will turn on and off at the same frequency (e.g. 50 Hz) as that of the input voltage $V_{in}$ shown at (A) in FIG. 4. All the other switches $Q_3$–$Q_6$ will turn on and off as dictated by the duration-modulated pulses of the high repetition rate (e.g. 20 kHz).

A positive-going current will flow through the path comprising the power supply 3, first inductor $L_1$, first switch $Q_1$, fifth switch $Q_5$, second inductor $L_2$, and load 11 when the first and fifth switches $Q_1$ and $Q_5$ are both on during each positive half-cycle, as from $t_0$ to $t_1$, of the FIG. 4(A) input voltage $V_{in}$. The voltage $V_{inv}$ between the junction 10 between the fifth and sixth switches $Q_5$ and $Q_6$ and the grounded terminal 5 or 7 will then be approximately equal to the input voltage $V_{in}$.

A positive-going current will flow through the path comprising the power supply 3, first inductor $L_1$, first switch $Q_1$, capacitor C, sixth switch $Q_6$, second inductor $L_2$, and load 11 when the first and sixth switches $Q_1$ and $Q_6$ are both on during each positive half-cycle, as from $t_0$ to $t_1$, of the input voltage $V_{in}$. The voltage $V_{inv}$ between the junction 10 between the fifth and sixth switches $Q_5$ and $Q_6$ and the grounded terminal 5 or 7 will then be approximately equal to the difference between the input voltage $V_{in}$ and the voltage $V_c$ across the capacitor C.

A negative-going current will flow through the path comprising the power supply 3, load 11, second inductor $L_2$, sixth switch $Q_6$, second switch $Q_2$, and first inductor $L_1$ when the second and sixth switches $Q_2$ and $Q_6$ are both on during each negative half-cycle, as from $t_1$ to $t_2$, of the input voltage $V_{in}$ in Stepdown Mode. The voltage $V_{inv}$ between the junction 10 between the fifth and sixth switches $Q_5$ and $Q_6$ and the grounded terminal 5 or 7 will be approximately equal to the input voltage $V_{in}$.

A negative-going current will flow through the path comprising the power supply 3, load 11, second inductor $L_2$, fifth switch $Q_5$, capacitor C, second switch $Q_2$, and first inductor $L_1$ when the second and fifth switches $Q_2$ and $Q_5$ are both on during each negative half-cycle, as from $t_1$ to $t_2$, of the input voltage $V_{in}$. The voltage $V_{inv}$ between the junction 10 between the fifth and sixth switches $Q_5$ and $Q_6$ and the grounded terminal 5 or 7 will be approximately equal to the difference between the input voltage $V_{in}$ and the voltage $V_c$ across the capacitor C.

As is apparent from the foregoing, as the fifth and sixth switches $Q_5$ and $Q_6$ are turned on and off at the high frequency in Stepdown Mode, there will be alternately created a period in which the voltage $V_{inv}$ between the junction 10 between the fifth and sixth switches $Q_5$ and $Q_6$ and the grounded terminal 5 or 6 is approximately equal to the input voltage $V_{in}$, and a period in which that voltage $V_{inv}$ is approximately equal to the difference between the input voltage $V_{in}$ and the capacitor voltage $V_c$. The result is the output voltage $V_o$ that is lower than the input voltage $V_{in}$.

The third and fourth switches $Q_3$ and $Q_4$ are conducive to the improvement of the power factor and the elimination of higher harmonics in Stepdown Mode, as in Nonconversion Mode.

The third and fourth switches $Q_3$ and $Q_4$ also function to keep the voltage $V_c$ of the capacitor C under control. This capacitor is charged through the circuit comprising the first, second, fifth and sixth switches $Q_1$, $Q_2$, $Q_5$ and $Q_6$ in Stepdown Mode. If left uncontrolled, therefore, the capacitor C would be charged indefinitely. This possibility is averted as the third and fourth switches $Q_3$ and $Q_4$ are turned on and off at the high frequency to discharge the capacitor C. The capacitor discharge will take place as follows:

First, when the input voltage $V_{in}$ is in its positive half-cycle and, at the same time, when the fourth switch $Q_4$ is on, the current discharged from the capacitor C will flow through the closed circuit comprising the capacitor C, first switch $Q_1$, first inductor $L_1$, power supply 3, and fourth switch $Q_4$. Energy will then be stored on the first inductor $L_1$. Then, as the third switch $Q_3$ is turned on during the positive half-cycle of the input voltage $V_{in}$, the energy that has been stored on the first inductor $L_1$ will be released through the closed circuit comprising the first inductor $L_1$, power supply 3, third switch $Q_3$, and first switch $Q_1$. The energy will be fed from first inductor $L_1$ back to power supply 3.

Thus, as the third and fourth switches $Q_3$ and $Q_4$ are controlled by the duration-modulated pulses, (D) and (F) in FIG. 4, at a repetition frequency much higher than the input voltage frequency, the discharge periods of the capacitor C will be controlled by the pulse durations in such a way that the capacitor voltage $V_c$ will remain practically constant.

When the third switch $Q_3$ is on during the negative half-cycles of the input voltage $V_{in}$, the capacitor C will be discharged through the closed circuit formed by the capacitor C, third switch $Q_3$, power supply 3, first inductor $L_1$, and second switch $Q_2$. Further, when the fourth switch $Q_4$ is on during the negative half-cycles of the input voltage $V_{in}$, the inductor $L_1$ will release its energy through the closed circuit comprising the first inductor $L_1$, second switch $Q_2$, fourth switch $Q_4$, and power supply 3.

Stepup Mode

Figure 5:
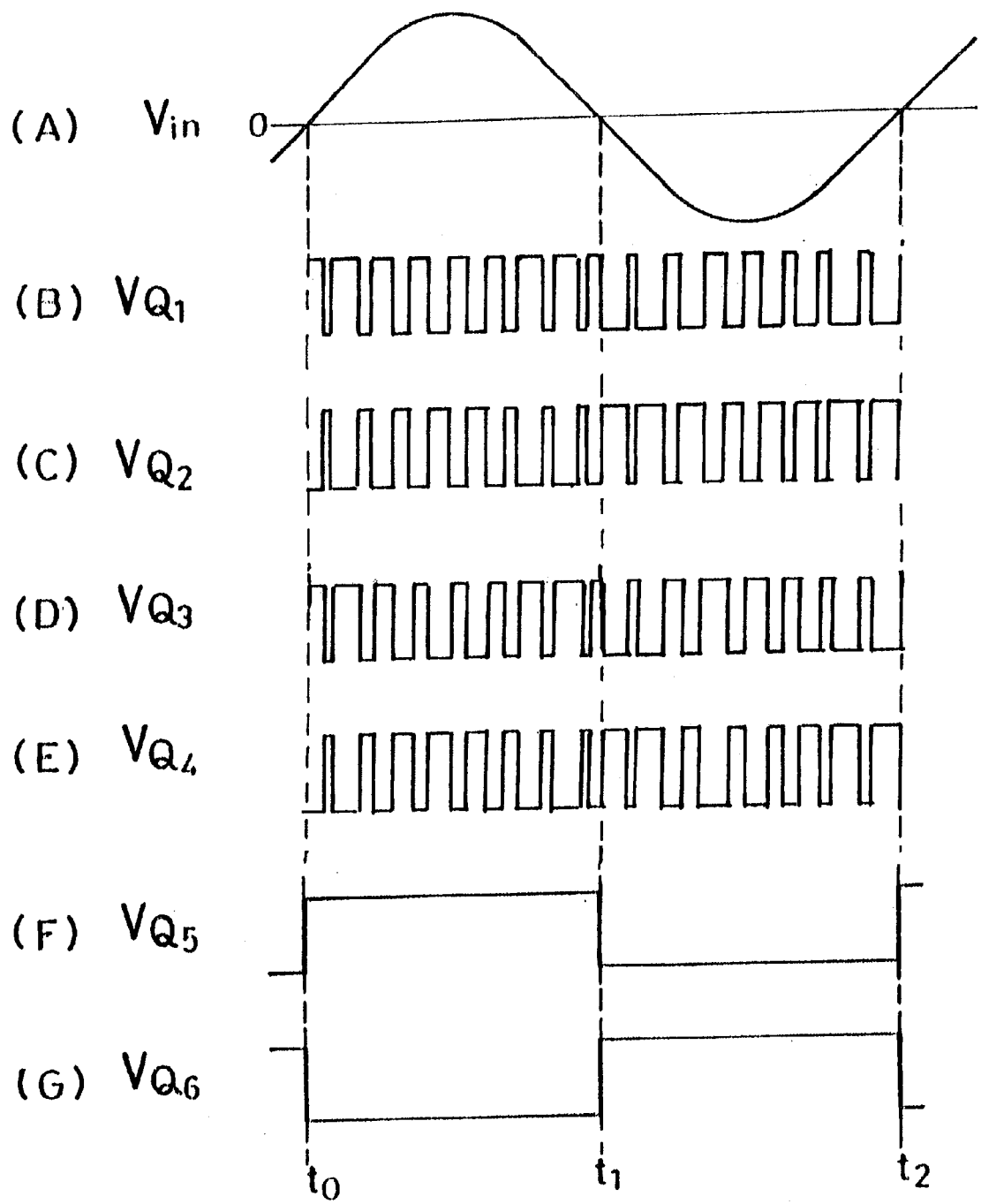
FIG. 5, consisting of (A) through (G), is a series of waveform diagrams explanatory of how the six switches of the FIG. 1 converter are driven in response to the input voltage in Stepup Mode.

In Stepup Mode the six switches $Q_1$–$Q_6$ of the FIG. 1 power converter circuit 1 are under the control of the switch control signals $V_{Q1}$–$V_{Q6}$, respectively, which are shown at (B)–(G) in FIG. 5. It will be observed from these waveform diagrams that the first to fourth switches $Q_1$–$Q_4$ are controlled at the high frequency, and the fifth to sixth switches $Q_5$ and $Q_6$ at the low frequency.

More specifically, in Stepup Mode, a current will flow in a first direction through the path comprising the power supply 3, first inductor $L_1$, first switch $Q_1$, fifth switch $Q_5$, second inductor $L_2$, and load 11 when the first and fifth switches $Q_1$ and $Q_5$ are both on during the positive half-cycles, as from $t_0$ to $t_1$ in FIG. 5, of the input voltage $V_{in}$. The voltage $V_{inv}$ between the junction 10 between the fifth and sixth switches $Q_5$ and $Q_6$ and the grounded terminal 5 or 7 at this time will be approximately the same as the input voltage $V_{in}$.

A current will flow in the first direction through the path comprising the power supply 3, first inductor $L_1$, second switch $Q_2$, capacitor C, fifth switch $Q_5$, second inductor $L_2$, and load 11 when the second and fifth switches $Q_2$ and $Q_5$ are both on during the positive half-cycles of the input voltage $V_{in}$. The output voltage $V_o$ at this time will be the sum of the input voltage $V_{in}$ and the capacitor voltage $V_c$.

A current will flow in a second direction through the path comprising the power supply 3, load 11, second inductor $L_2$, sixth switch $Q_6$, second switch $Q_2$, and first inductor $L_1$ when the second and sixth switches $Q_2$ and $Q_6$ are both on during the negative half cycles, as from $t_1$ to $t_2$ in FIG. 5, of the input voltage $V_{in}$. The output voltage $V_o$ at this time will be the sum of the input voltage $V_{in}$ and the voltage across the first inductor $L_1$.

A current will flow in the second direction through the path comprising the power supply 3, load 11, second inductor $L_2$, sixth switch $Q_6$, capacitor C, first switch $Q_1$, and first inductor $L_1$ when the first and sixth switches $Q_1$ and $Q_6$ are both on during the negative half-cycles of the input voltage $V_{in}$. The voltage $V_{inv}$ between the junction 10 between the fifth and sixth switches $Q_5$ and $Q_6$ and the grounded terminal 5 or 7 at this time will be approximately the same as the input voltage $V_{in}$.

The desired objectives of power factor and waveform improvement are accomplished in Stepup Mode, too, thanks to the third and fourth switches $Q_3$ and $Q_4$.

The capacitor voltage $V_c$ is controllable through on-off control of the third and fourth switches $Q_3$ and $Q_4$. These switches are turned on and off at a higher frequency (20 kHz) than are the fifth and sixth switches $Q_5$ and $Q_6$ in order to keep the capacitor C from an undesired voltage drop in Stepup Mode, as will be detailed hereinbelow.

The capacitor C will be charged from the power supply 3 through the closed circuit comprising the first inductor $L_1$, first switch $Q_1$, capacitor C, and fourth switch $Q_4$ when the input voltage $V_{in}$ is in its positive half-cycles, and at the same time, when the fourth switch $Q_4$ is on. Since then the first inductor $L_1$ releases the energy that has been stored therein, the capacitor C will be charged by the resultant of the supply voltage $V_{in}$ and the first inductor voltage, which is higher than the output voltage $V_o$. Energy will be stored on the first inductor $L_1$ when the third switch $Q_3$ is on during the positive half-cycles of the input voltage $V_{in}$, as then a current path will be completed which comprises the power supply 3, first inductor $L_1$, first switch $Q_1$, and third switch $Q_3$.

A current will flow through a path comprising the power supply 3, third switch $Q_3$, capacitor C, second switch $Q_2$, and first inductor $L_1$ when the third switch is on during the negative half-cycles of the input voltage $V_{in}$. The capacitor C will therefore be charged by the resultant of the supply voltage $V_{in}$ and the first inductor voltage.

A current will flow through a path comprising the power supply 3, fourth switch $Q_4$, second switch $Q_2$, and first inductor $L_1$ when the fourth switch is on during the negative half-cycles of the input voltage $V_{in}$. Energy will therefore be stored on the first inductor $L_1$.

As is clear from the foregoing, the first and second switches $Q_1$ and $Q_2$ serve mainly for voltage stepup, the third and fourth switches $Q_3$ and $Q_4$ mainly for power factor and waveform improvement, and the fifth and sixth switches $Q_5$ and $Q_6$ mainly for voltage stepdown.

Converter Control Circuit

As illustrated in detail in FIG. 2, the converter control circuit 2 broadly comprises an input voltage detector circuit 41, a direct voltage detector circuit 42, an output voltage detector circuit 43, a first or input-stage voltage command generator circuit 44, a second or output-stage voltage command generator circuit 45, a rectangular wave generator 46, three arithmetic circuits 47, 48 and 49, two limiters 50 and 51, a triangular wave generator 52, three comparators 53, 54 and 55, and three inverters or NOT circuits 56, 57 and 58.

The input voltage detector circuit 41 is connected to the pair of voltage converter input terminals 4 and 5, FIG. 1, by way of lines 18 and 19 for generating a referential sinusoidal wave by detecting the supply voltage $V_{in}$. The direct voltage detector circuit 42 is connected to the pair of opposite polarity terminals of the capacitor C, FIG. 1, by way of lines 21 and 22 for providing a signal indicative of the capacitor voltage $V_c$. The output voltage detector circuit 43 is connected to the pair of voltage converter output terminals 6 and 7, FIG. 1, by way of lines 19 and 20 for providing a signal indicative of the output voltage $V_0$. In practice the voltage signals put out by the three detector circuits 41–43 may be conveniently less than the actual supply voltage $V_{in}$, actual capacitor voltage $V_c$, and actual output voltage $V_o$. For the ease of understanding, however, the voltage outputs of these detector circuits will be assumed to be equal to the actual voltages in the following continued explanation of the converter control circuit 2.

The first or input-stage voltage command generator circuit 44 includes a subtracter 60 having inputs connected to the direct voltage detector circuit 42 and a unidirectional reference voltage source 59 for providing a signal indicative of the difference between the capacitor voltage $V_c$ and the reference voltage. The output of the subtracter 60 is connected to a proportional integrator (PI) 61 and thence to a multiplier 62, the other input of which is connected to the input voltage detector circuit 41. The difference signal is therefore multiplied by the referential sinusoidal wave, with an effective value of, say, 100 volts, supplied from the input voltage detector circuit 41. The resulting output from the multiplier 62 represents the desired magnitude of the input current for holding the capacitor voltage $V_c$ constant.

Also included in the input-stage voltage command generator circuit 44 is a subtracter 63 having one input connected to the multiplier 62, and another to the current detector 23, FIG. 1, by way of the line 24. The output from the subtracter 63 indicates the difference between the actual and desired magnitudes of the input current. The subtracter output is directed into another PI 64 before being put out from the first voltage command generator circuit 44 as the first or input-stage voltage command $V_{rc}$ for changing to the desired value the voltage $V_{conv}$ of the fundamental wave, with a frequency equal to that of the input voltage $V_{in}$, between the junction 8 between the first and second switches $Q_1$ and $Q_2$ and the junction between the third and fourth switches $Q_3$ and $Q_4$. The output-stage voltage command $V_{rc}$ has a more or less sinusoidal waveform in synchronism with the input voltage $V_{in}$ in and contains information on how to control the capacitor voltage $V_c$ and how to improve the power factor.

The second or output-stage voltage command generator circuit 45 comprises a referential output voltage command generator 66, a subtracter 67, and a proportional integrator-differentiator (PID) 68. The output-stage voltage command generator circuit 45 is designed to make changes possible in the output voltage $V_0$ in the face of the same input voltage $V_{in}$. Toward this end the referential output voltage command generator 66, included in the output-stage voltage command generator circuit 45, produces the following three different referential output voltage commands for the three different modes of operation:

(a) A first command $V_{O1}$ for Nonconversion Mode, dictating that the input and output voltages be equal, that is, $V_0=V_{in}$;

(b) A second command $V_{O2}$ for Stepdown Mode, dictating that the output voltage $V_0$ be less than the input voltage $V_{in}$ by a volts, that is, $V_0=V_{in}-a$; and (c) A third command $V_{O3}$ for Stepup Mode, dictating that the output voltage $V_o$ be higher than the input voltage $V_{in}$ by b volts, that is, $V_o=V_{in}+b$.

The output from the referential output voltage command generator 66 has a more or less sinusoidal waveform in synchronism with the input voltage $V_{in}$.

Not all, but only two, of Nonconversion, Stepdown, and Stepup Modes may be required in some applications of the invention. In such cases the referential output voltage command generator 66 may be reconfigured to put out two referential output voltage commands for the chosen two modes.

The subtracter 67, another component of the output-stage voltage command generator circuit 45, puts out a signal indicative of the difference between the output from the output voltage detector circuit 43 and the referential output voltage command generator 66. This subtracter output is directed into the PID circuit 68 and thence put out from the output-stage voltage command generator circuit 45 as the noted output-stage or inverter voltage command $V_{ri}$. This command $V_{ri}$ is intended for changing to the desired value the fundamental wave voltage $V_{inv}$ between the junction 9, FIG. 1, between the third and fourth switches $Q_3$ and $Q_4$ and the junction 10 between the fifth and sixth switches $Q_5$ and $Q_6$. Its waveform is also more or less sinusoidal and synchronous with the input voltage $V_{in}$.

Put out as above from the output-stage voltage command generator circuit 45, the second command $V_{ri}$ is equal to the first command $V_{rc}$ in Nonconversion Mode, lower than the first command in Stepdown Mode, and higher than the first command in Stepup Mode, provided that the input voltage $V_{in}$ is constant.

In order to keep the output voltage $V_o$ constant, the output from the referential output voltage command generator 66 of the output-stage voltage command generator circuit 45 must be held constant. For example, regardless of whether the input voltage $V_{in}$ is 100 volts or 200, the output from the referential output voltage command generator 66 must be the same for providing a constant output voltage $V_o$ of, say, 100 volts. The output voltage $V_o$ will nonetheless be constant as the output from the input voltage detector circuit 41 changes with the input voltage $V_{in}$, causing a corresponding change in the input-stage voltage command $V_{rc}$ produced by the first voltage command generator circuit 44.

Changes in mode, for changes in output voltage $V_o$ or input voltage $V_{in}$, will be implemented automatically by the six switches $Q_1$–$Q_6$ under the control of the arithmetic circuit means yet to be described.

For selectively setting the power converter circuit in Nonconversion, Stepdown, or Stepup Mode, the converter control circuit further comprises the rectangular wave generator circuit 46 and three arithmetic circuits 47–49.

Figure 6:
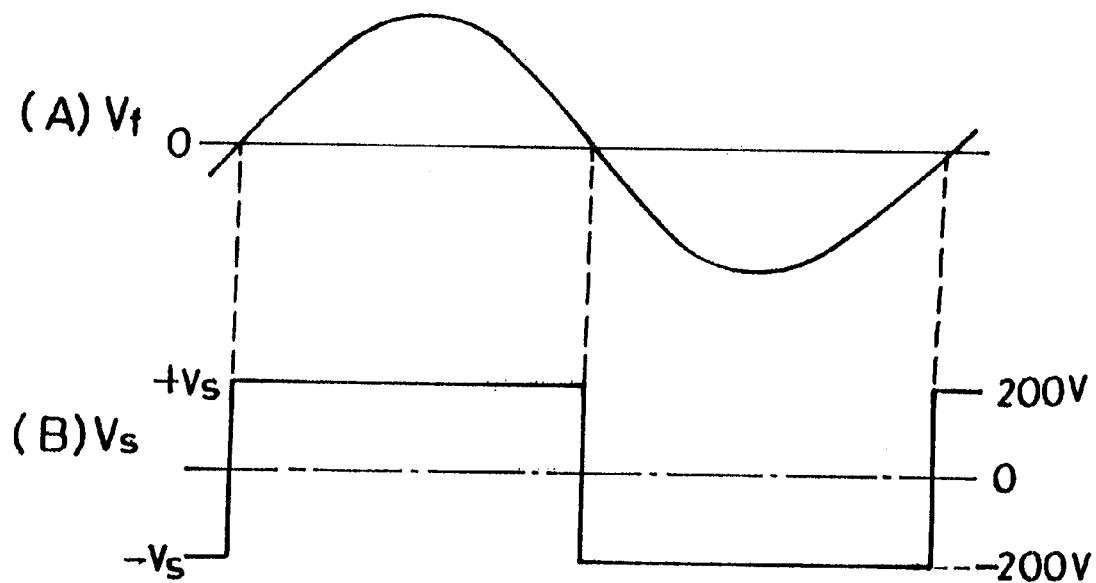
FIG. 6, consisting of (A) and (B), shows the input and output waveforms of the rectangular wave generator of the FIG. 2 converter control circuit.

The rectangular wave generator circuit 46 is shown as a serial connection of an amplifier 69, connected to the output the input voltage detector circuit 41, and a limiter 70. Inputting the 50-Hz referential sine wave $V_f$, shown at (A) in FIG. 6, the amplifier 69 amplifies it to such a level that its peak is well above 200 volts. The limiter 70 limits the output from the amplifier 69 between a first voltage $+V_s$ (e.g. +200 volts), which is equal to or higher than the maximum value of the triangular wave produced by the triangular wave generator 52 yet to be referred to, and a second voltage $-V_s$ (e.g. −200 volts), which is equal to or less than the minimum value of the triangular wave. The resulting output from the limiter 70 is a rectangular wave voltage $V_s$, FIG. 7, in which the $+V_s$ and $-V_s$ levels alternate.

The first arithmetic circuit 47 of the FIG. 2 converter control circuit 2 is connected to all of the input-stage voltage command generator circuit 44, the output-stage voltage command generator circuit 45, and the rectangular wave generator 46, in order to perform the arithmetic operation of $V_{rc}+V_s-V_{ri}$. Comprising an adder and a subtracter, both not shown, the first arithmetic circuit 47 adds the first command (input-stage or converter voltage command) $V_{rc}$ and the rectangular wave voltage $V_s$ to each other and subtracts the second command (output-stage or inverter voltage command) $V_{ri}$ from the sum. The sequence of computations could be reversed into $V_{rc}-V_{ri}+V_s$.

The second arithmetic circuit 48 is likewise connected to all of the input-stage voltage command generator circuit 44, the output-stage voltage command generator circuit 45, and the rectangular wave generator 46, this one to perform a different arithmetic operation of $V_{ri}+V_s-V_{rc}$. Again comprising an adder and a subtracter, the second arithmetic circuit 48 adds the second command $V_{ri}$ and the rectangular wave $V_s$ to each other and subtracts the first command $V_{rc}$ from the sum. The computational sequence could be reversed into $V_{ri}-V_{rc}+V_s$.

Connected to the output of the first arithmetic circuit 47, the first limiter 50 confines the output from the first arithmetic circuit between an upper limit that is equal to, or somewhat more than, the maximum value $+V_s$ of the rectangular wave voltage $V_s$ and a lower limit that is equal to, or somewhat less than, the minimum value $-V_s$ of the rectangular wave voltage. The resulting output from the first limiter 50 is referred to as the first switch control command $V_{r1}$, which dictates a voltage to be built up by the input-stage switches $Q_1$ and $Q_2$.

Figure 7:
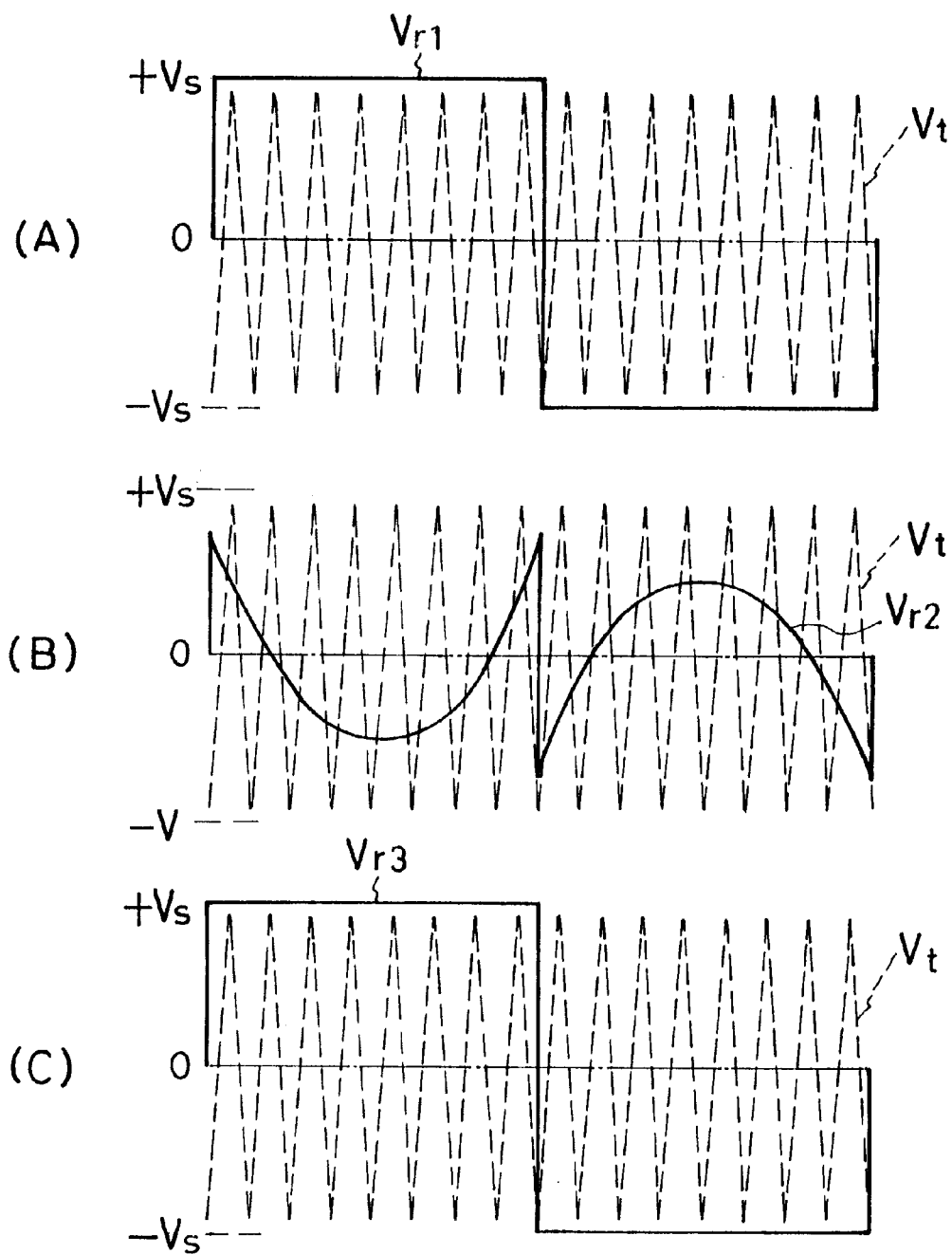
FIG. 7, consisting of (A) through (C), shows the waveforms of the inputs to the three comparators of the FIG. 2 converter control circuit in Nonconversion Mode.
Figure 8:
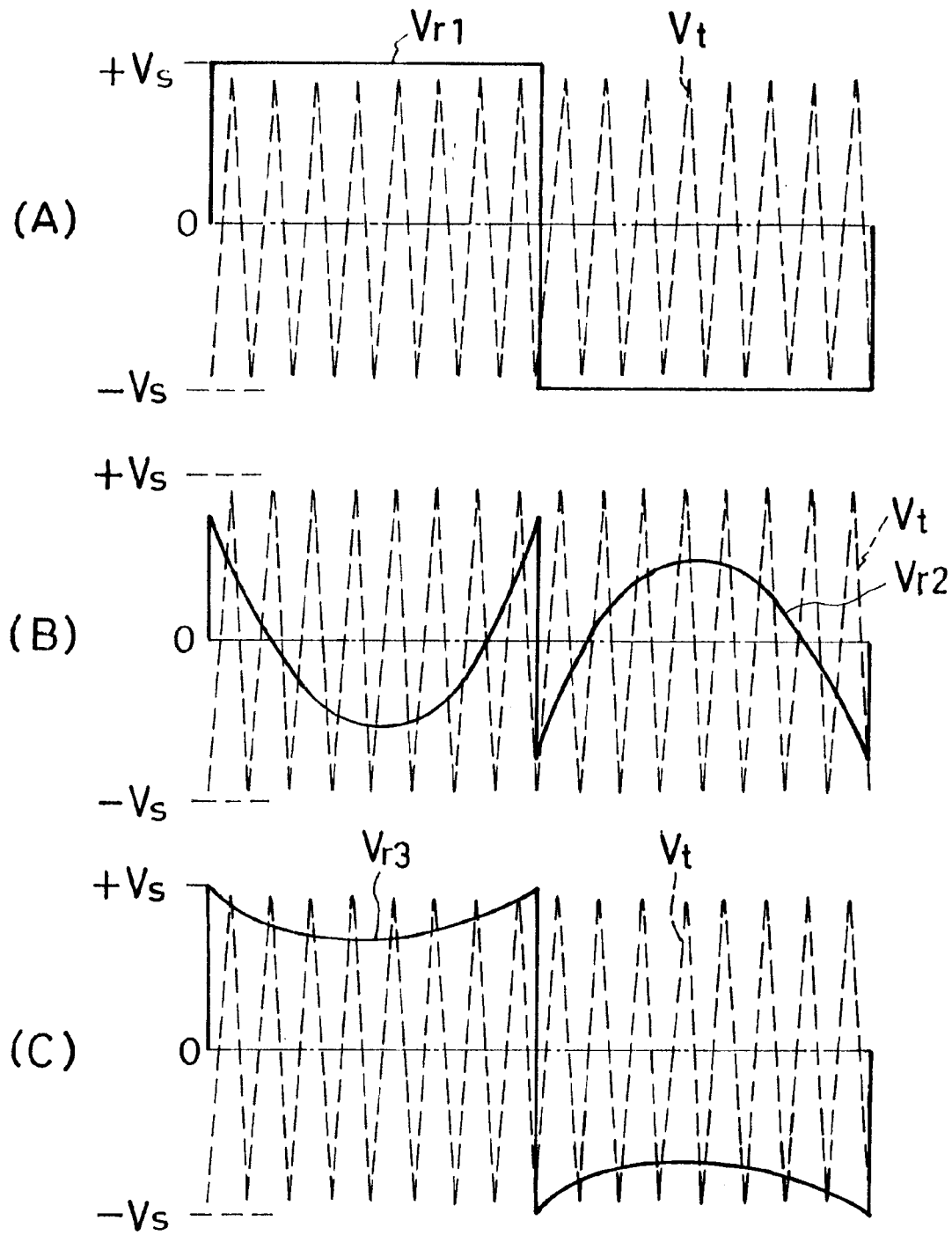
FIG. 8, consisting of (A) through (C), shows the waveforms of the inputs to the three comparators of the FIG. 2 converter control circuit in Stepdown Mode.
Figure 9:
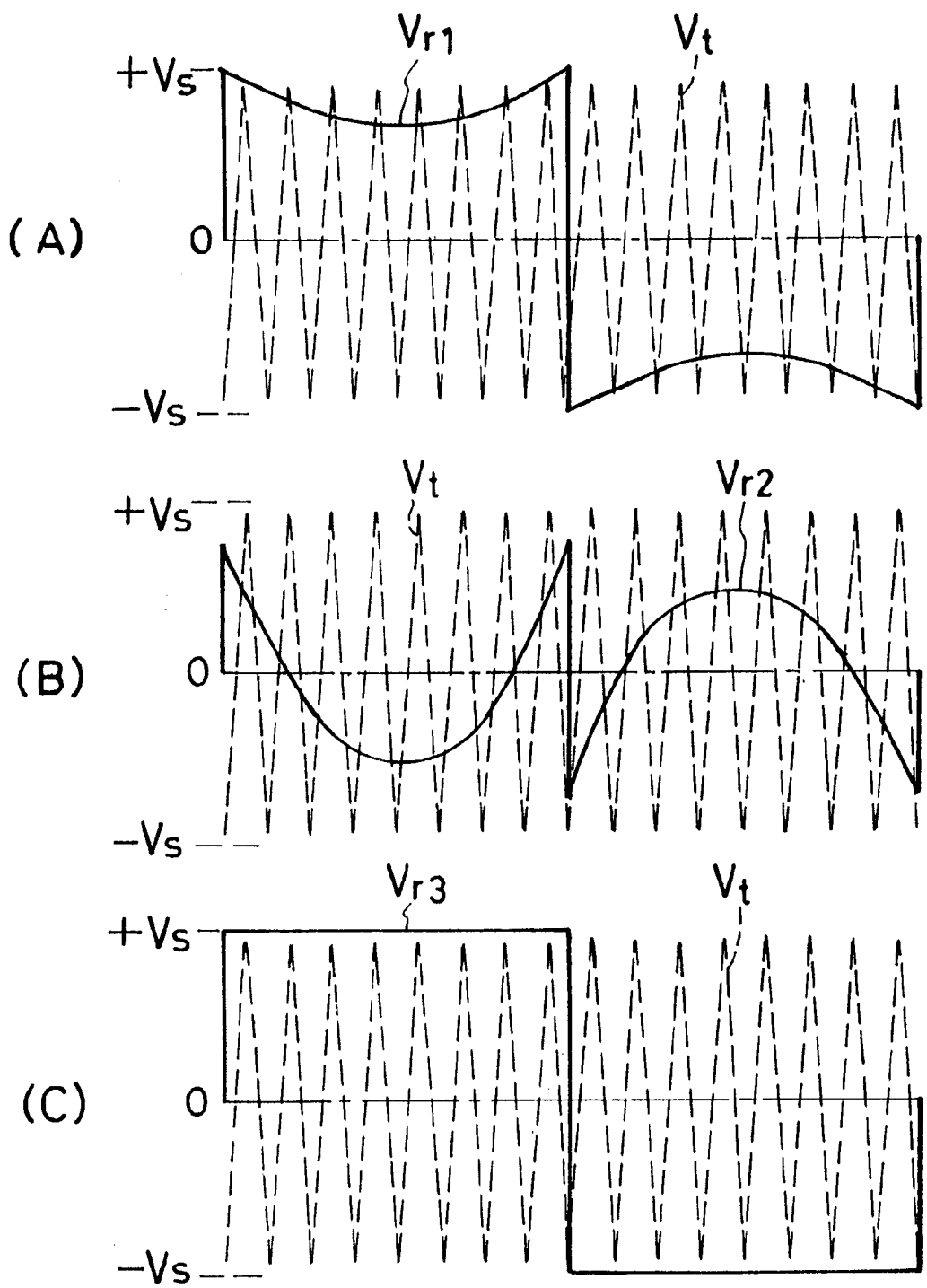
FIG. 9, consisting of (A) through (C), shows the waveforms of the inputs to the three comparators of the FIG. 2 converter control circuit in Stepup Mode.

At (A) in FIGS. 7–9 are shown the waveforms of the first switch control command $V_{r1}$ in Nonconversion, Stepdown, and Stepup Modes, respectively, on the assumption that its upper and lower limits are $+V_s$ and $-V_s$. It will be observed that the first switch control command $V_{r1}$ is equivalent to the rectangular wave voltage $V_s$ in Nonconversion and Stepdown Modes and has different values intermediate $+V_s$ and $-V_s$ in Stepup Mode.

Connected to the output of the second arithmetic circuit 48, the second limiter 51 confines the output from the second arithmetic circuit between an upper limit that is equal to, or slightly more than, the maximum value $+V_s$ of the rectangular wave voltage $V_s$, and a lower limit that is equal to, or slightly less than, the minimum value $-V_s$ of the rectangular wave voltage. The resulting output from the second limiter 51 is referred to as the second switch control command $V_{r3}$, indicative of a voltage to be developed by the output-stage switches $Q_5$ and $Q_6$.

FIGS. 7–9 show at (C) the waveforms of the second switch control command $V_{r3}$ in Nonconversion, Stepdown, and Stepup Modes, respectively, again on the assumption that its upper and lower limits are $+V_s$ and $-V_s$. The second switch control command $V_{r3}$ is equivalent to the rectangular wave voltage $V_s$ in Nonconversion and Stepup Modes and has values intermediate $+V_s$ and $-V_s$ in Stepdown Mode.

Connected to both output-stage voltage command generator circuit 45 and second limiter 51, the third arithmetic circuit 49 computes the subtraction, $V_{r3}-V_{ri}$. This circuit 49 is in short a subtracter, subtracting the output-stage voltage command $V_{ri}$ from the second switch control command $V_{r3}$ to provide a third switch control command $V_{r2}$, which is indicative of a voltage across the capacitor C.

The following relations exist between the switch control commands $V_{r1}$, $V_{r2}$ and $V_{r3}$ and the fundamental wave voltages at the switch junctions 8–10 of FIG. 1:

$$V_1=(V_c/2)V_{r1},$$

$$V_2=(V_c/2)V_{r2},$$

$$V_3=(V_c/2)V_{r3},$$

$$V_{inv}=V_3-V_2,$$

and $$V_{conv}=V_1-V_2,$$

where:

$V_1$=fundamental wave voltage at the junction 8 between the first and second switches $Q_1$ and $Q_2$, $V_2$=fundamental wave voltage at the junction 9 between the third and fourth switches $Q_3$ and $Q_4$, and $V_3$=fundamental wave voltage at the junction 10 between the fifth and sixth switches $Q_5$ and $Q_6$.

As indicated at (B) in FIGS. 7–9, the second switch control command $V_{r2}$ is intermediate the limits $+V_s$ and $-V_s$ in all of Nonconversion, Stepdown, and Stepup Modes.

The foregoing will have made clear how the three switch control commands $V_{r1}$, $V_{r2}$ and $V_{r3}$ are produced by the arithmetic means comprising the three arithmetic circuits 47–49 and two limiters 50 and 51. In order to produce control signals $V_{Q1}$–$V_{Q6}$ for the six switches $Q_1$–$Q_6$ of the FIG. 1 power converter circuit 1 from the switch control commands, there are provided the aforesaid triangular wave generator 52, three comparators 53, 54 and 55, and three NOT circuits 56, 57 and 58.

The triangular wave generator 53 generates a triangular wave voltage $V_t$, indicated by the dashed lines in all of FIGS. 7–9, having a frequency (e.g. 20 kHz) that is higher than twice the frequency (e.g. 50 Hz) of the supply voltage $V_{in}$. The maximum value of this triangular wave voltage $V_t$ should be equal to, or slightly less than, that of the rectangular wave voltage $V_s$ or the upper limit $+V_s$ imposed by the limiters 50 and 51. The minimum value of the triangular wave voltage $V_t$ should be equal to, or slightly more than, that of the rectangular wave voltage $V_s$ or the lower limit $-V_s$ of the limiters 50 and 51.

Although FIG. 2 shows the one triangular wave generator 52 as being connected to all of the comparators 53–55, three such generators could of course be provided, one for each comparator. Also, the triangular wave generator itself could be replaced by a familiar sawtooth generator.

The first comparator 53 has its inputs connected to the first limiter 50 and the triangular wave generator 52 for comparing the first switch control command $V_{r1}$ with the triangular wave voltage $V_t$ as at (A) in FIGS. 7–9. The resulting output from the first comparator 53 is the first switch control signal $V_{Q1}$ shown at (B) in FIGS. 3–5. The first switch control signal $V_{Q1}$ is applied directly to the first switch $Q_1$, FIG. 1, by way of the line 12.

Connected to the output of the first comparator 53, the first NOT circuit 56 inverts the first switch control signal $V_{Q1}$ in phase and puts out the second switch control signal $V_{Q2}$ shown at (C) in FIGS. 3–5. This second switch control signal $V_{Q2}$ is applied to the second switch $Q_2$ by way of the line 13.

The second comparator 54 has its inputs connected to the third arithmetic circuit 49 and the triangular wave generator 52 for comparing the third switch control command $V_{r2}$ with the triangular wave voltage $V_t$ as at (B) in FIGS. 7–9. The resulting output from the second comparator 54 is the third switch control signal $V_{Q3}$ shown at (D) in FIGS. 3–5. The third switch control signal $V_{Q3}$ is applied directly to the third switch $Q_3$, FIG. 1, by way of the line 14.

Also connected to the output of the second comparator 54, the second NOT circuit 57 inverts the third switch control signal $V_{Q3}$ in phase and puts out the fourth switch control signal $V_{Q4}$ shown at (E) in FIGS. 3–5. The fourth switch control signal $V_{Q4}$ is applied to the fourth switch $Q_4$ by way of the line 15.

The third comparator 55 has its inputs connected to the second limiter 51 and the triangular wave generator 52 for comparing the second switch control command $V_{r3}$ with the triangular wave voltage $V_t$ as at (C) in FIGS. 7–9. The resulting output from the third comparator 55 is the fifth switch control signal $V_{Q5}$ shown at (F) in FIGS. 3–5. The fifth switch control signal $V_{Q5}$ is applied directly to the fifth switch $Q_5$ by way of the line 16.

Connected to the output of the third comparator 55, the third NOT circuit 58 inverts the fifth switch control signal $V_{Q5}$ in phase and puts out the sixth switch control signal $V_{Q6}$ shown at (G) in FIGS. 3–5. The sixth switch control signal $V_{Q6}$ is applied to the sixth switch $Q_6$ by way of the line 17.

Notwithstanding the showing of FIG. 2, the comparators 53–55 and NOT circuits 56–58 need not be discrete parts; instead, the comparators may integrally incorporate the respective NOT circuits, each to provide two switch control signals of opposite phase relationship to each other.

Mode Switching

Figure 11:
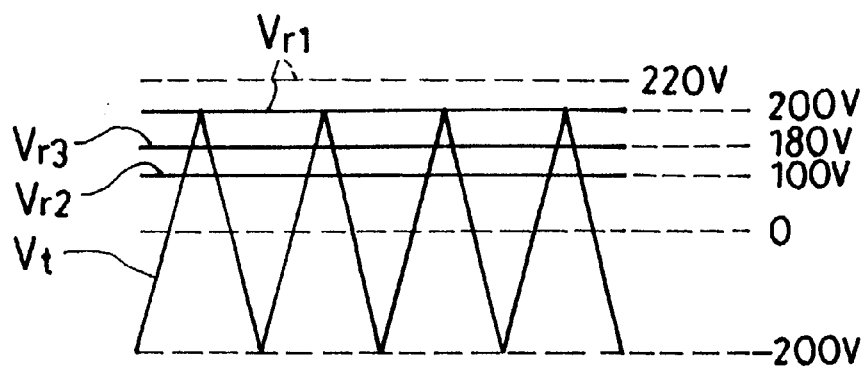
FIG. 11 is a waveform diagram similar to FIG. 10 but explanatory of the signal relationship in Stepdown Mode.
Figure 12:
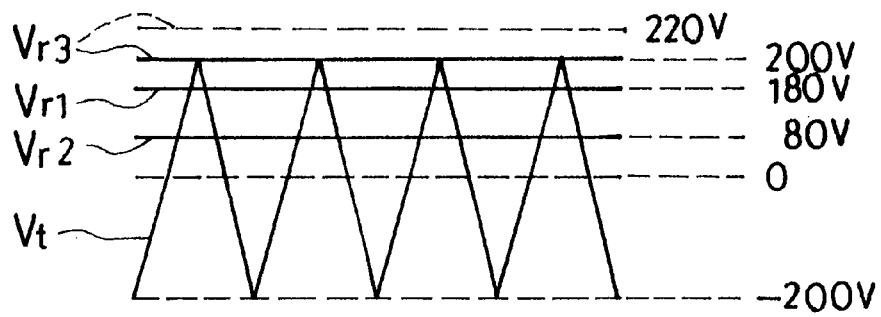
FIG. 12 is also a waveform diagram similar to FIG. 10 but explanatory of the signal relationship in Stepup Mode.

Switching from one mode to another, or from one output voltage to another, is possible by changing the output from the referential output voltage command generator 66, FIG. 2, of the output-stage voltage command generator circuit 45, as will be discussed in detail hereinbelow with reference to FIGS. 10–12. Such detailed discussion presupposes that the input voltage $V_{in}$ is fixed at 100 volts in all the modes, and that the output voltage $V_o$ is 100 volts in Nonconversion Mode, 80 volts in Stepdown Mode, and 120 volts in Stepup Mode. Further, for the ease of understanding, the input-stage or converter voltage command $V_{rc}$ is assumed to be fixed at 100 volts in each mode, and the output-stage or inverter voltage command $V_{ri}$ to be 100 volts in Nonconversion Mode, 80 volts in Stepdown Mode, and 120 volts in Stepup Mode.

Nonconversion Mode

The output from the first arithmetic circuit 47 during the positive half-wave periods of the supply voltage $V_{in}$ in Nonconversion Mode will be $V_{rc}+V_s-V_{ri}$, or, under the conditions set forth above, 100+200−100=200 (V). This value is equal to the upper limit of the amplitude allowed through the limiter 50, so that the first switch control command $V_{r1}$ put out therefrom will also be 200 volts.

Figure 10:
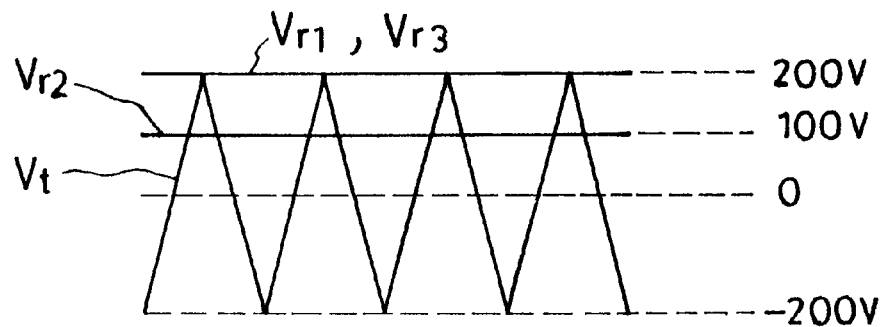
FIG. 10 is a waveform diagram explanatory of the relationship between the triangular wave voltage applied to one input of each of the three comparators of the FIG. 2 converter control circuit and the signals applied to the other inputs of the comparators in Nonconversion Mode.

As will be understood from FIG. 10, the 200-volt switch control command $V_{r1}$ is equal to the peak of the triangular wave voltage $V_t$ and so does not cross the triangular wave voltage. The output from the first comparator 53 will be consecutively high during each positive half-cycle of the input voltage $V_{in}$, and low during each negative half-cycle thereof FIG. 3 indicates at (B) and (C) the switch control signals $V_{Q1}$ and $V_{Q2}$ thus applied to the first and second switches $Q_1$ and $Q_2$. These switches are turned n and off at as low a frequency as 50 Hz, thus functioning as rectifiers.

The output from the second arithmetic circuit 48 during the positive half-cycles of the input voltage $V_{in}$ in Nonconversion Mode will be 200 volts ($V_{ri}+V_s-V_{rc}$=100+200−100=200). This output is equal to the upper limit of the second limiter 51, so that the second switch control command $V_{r3}$ will also be 200 volts. The second switch control command $V_{r3}$ will be −200 volts during the negative half-cycles of the input voltage $V_{in}$. As shown at (F) in FIG. 3, the output from the third comparator 55 will be the same as the FIG. 3(B) output from the first comparator 53. The fifth and sixth switches $Q_5$ and $Q_6$ will function as rectifiers by being actuated by the 50-Hz switch control signals $V_{Q5}$ and $V_{Q6}$ of FIGS. 3(F) and (G).

The third switch control command $V_{r2}$ from the third arithmetic circuit 49 will be 100 volts ($V_{r3}-V_{ri}$=200−100=100) during the positive half-cycles of the input voltage $V_{in}$ in Nonconversion Mode, and −100 volts during the negative half-cycles of the input voltage. The third switch control command $V_{r2}$ crosses the triangular wave voltage $V_t$ as in FIG. 10, so that the second comparator 54 will put out the third switch control signal $V_{Q3}$ of FIG. 3(D). The third and fourth switches $Q_3$ and $Q_4$ will be controlled respectively by the duration-modulated switch control signals $V_{Q3}$ and $V_{Q4}$ of FIGS. 3(D) and (E) with a frequency of 20 kHz.

Stepdown Mode

The output from the first arithmetic circuit 47 will be 220 volts ($V_{rc}+V_s-V_{ri}$=100+200−80=220) during the positive half-cycles of the input voltage $V_{in}$ in Stepdown Mode. The first limiter 50 will reduce the 220-volt output from the first arithmetic circuit 47 to 200 volts. This first switch control command $V_{r1}$ does not cross the triangular wave voltage $V_t$ as in FIG. 11. The output from the first comparator 53 will be high.

During the negative half-cycles of the input voltage, on the other hand, the first switch control command $V_{r1}$ will be −200 volts. The output from the first comparator 53 will be low. The fist and second switches $Q_1$ and $Q_2$ will function as rectifiers in Stepdown Mode by being actuated by the low-frequency switch control signals $V_{Q1}$ and $V_{Q2}$ shown at (B) and (C) in FIG. 4.

The output from the second arithmetic circuit 48 will be 180 volts ($V_{rc}+V_s-V_{r1}$=100+200−120=180) during the positive half-cycles of the input voltage $V_{in}$. This value is within the limits of the second limiter 51, so that the second switch control command $V_{r3}$ will be 180 volts. The −180- volt second switch control command $V_{r3}$ crosses the triangular wave voltage $V_t$ at the third comparator 55, as in FIG. 11, and so does the −180-volt second switch control command $V_{r3}$ during the negative half-cycles of the input voltage $V_{in}$. The fifth and sixth switches $Q_5$ and $Q_6$ will be controlled by the duration-modulated high-frequency control signals $V_{Q5}$ and $V_{Q6}$, FIGS. 4(F) and (G), in Stepdown Mode.

The third switch control command $V_{r2}$ from the third arithmetic circuit 49 will be 100 volts ($V_{r3}-V_{ri}$=180−80= 100) during the positive half-cycles of the input voltage $V_{in}$ in Stepdown Mode. This value intersects the triangular wave voltage $V_t$ at the second comparator 54, as in FIG. 11. The third switch control command $V_{r2}$ will be −100 volts during the negative half-cycles of the of the input voltage $V_{in}$ and so also cross the triangular wave voltage $V_t$. The third and fourth switches $Q_3$ and $Q_4$ will be controlled by the high-frequency switch control signals $V_{Q3}$ and $V_{Q4}$ of FIGS. 4(D) and (E).

Stepup Mode

The output from the first arithmetic circuit 47 will be 180 volts ($V_{rc}+V_s-V_{ri}$=100+200−120=180) during the positive half-cycles of the input voltage $V_{in}$ in Stepup Mode. This value is within the limits of the first limiter 50, so that the first switch control command $V_{r1}$ will also be 180 volts, which crosses the triangular wave voltage $V_t$ at the first comparator 53, as in FIG. 12. The first switch control command $V_{r1}$ will be −180 volts during the negative half-cycles of the input voltage $V_{in}$, again crossing the triangular wave voltage $V_t$. Thus will the first and second switches $Q_1$ and $Q_2$ be controlled by the duration-modulated high-frequency switch control signals $V_{Q1}$ and $V_{Q2}$ shown at (B) and (C) in FIG. 5.

The output from the second arithmetic circuit 48 will be 220 volts ($V_{ri}+V_s-V_{rc}$=120+200−100=220) during the positive half-cycles of the input voltage $V_{in}$ in Stepup Mode. The 220-volt output will be reduced by the second limiter 51 to a 200-volt second switch control command $V_{r3}$, which does not cross the triangular wave voltage $V_t$ at the third comparator 55, as in FIG. 12. The second switch control command $V_{r3}$ will be −200 V during the negative half-cycles of the input voltage $V_{in}$, which does not cross the triangular wave voltage $V_t$, either. The fifth and sixth switches $Q_5$ and $Q_6$ will therefore be controlled by the low-frequency switch control signals $V_{Q5}$ and $V_{Q6}$ shown at (F) and (G) in FIG. 5 and so function as rectifiers.

The third switch control command $V_{r2}$ from the third arithmetic circuit 49 will be 80 volts ($V_{r3}-V_{ri}$=220−120=80) during the positive half-cycles of the input voltage $V_{in}$ in Stepup Mode. This value crosses the triangular wave voltage $V_t$ as in FIG. 12. The third switch control command $V_{r2}$ will be −80 volts during the negative half-cycles of the input voltage $V_{in}$. This value crosses the triangular wave voltage $V_t$, too. The third and fourth switches $Q_3$ and $Q_4$ will therefore be turned on and off at the high frequency as at (D) and (F) in FIG. 5.

It is self-evident from the foregoing operational description that the converter control circuit 2 operates in a like manner when the output voltage $V_o$ is to be held constant in the face of varying values of the input voltage $V_{in}$.

The advantages gained by this first preferred embodiment of the invention, set forth hereinbefore with reference to FIGS. 1–12, may be recapitulated as follows:

1. The switching frequency is reduced to 50 Hz for the switches $Q_1$, $Q_2$, $Q_5$ and $Q_6$ in Nonconversion Mode, for the switches $Q_1$ and $Q_2$ in Stepdown Mode, and for the switches $Q_5$ and $Q_6$ in Stepup Mode. Totally, the converter is greatly reduced in switchings, and hence in switching loss, per unit length of time.

2. The switches $Q_3$ and $Q_4$ are switched at a high frequency in all of Nonconversion, Stepdown, and Stepup Mode, with the consequent improvement in power factor and in the waveform of the input current, the latter improvement being equivalent to the curtailment of higher harmonics.

3. Switching from one mode to another is accomplished merely by causing a change in the output from the referential output voltage command generator 66 of the output-stage voltage command generator circuit 45. With the mode-switching circuit means thus simplified in construction, the power converter itself is appreciably reduced in size and the cost of manufacture.

4. The output voltage $V_0$ can be held constant in the face of changes in input voltage $V_{in}$ by holding constant the output from the referential output voltage command generator 66. Furthermore, with changes in input voltage $V_{in}$, the converter switches $Q_1$–$Q_6$ can be driven in any desired one of Nonconversion, Stepdown, and Stepup Mode.

Second Form

Figure 13:
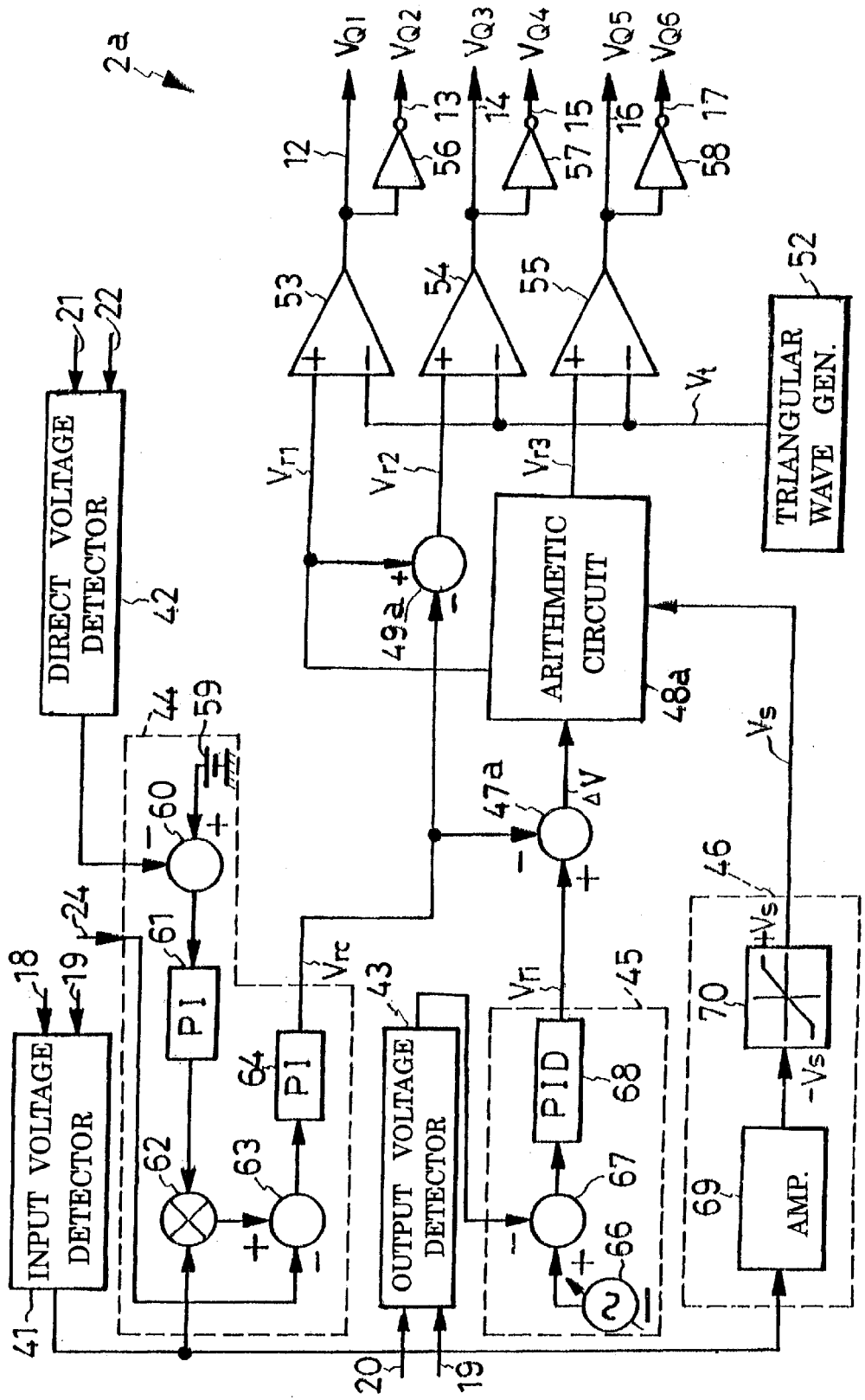
FIG. 13 is a diagram similar to FIG. 2 but showing a modified converter control circuit for use with the FIG. 1 power converter circuit.

FIG. 13 shows an alternative converter control circuit 2a which may be used with the FIG. 1 power converter circuit 1 in substitution for the FIG. 2 converter control circuit 2. The alternative converter control circuit 2a differs from its FIG. 2 counterpart only in the three arithmetic circuits 47a, 48a and 49a. The two circuits 2 and 2a are alike in all the other details of construction, so that like reference numerals are used to denote like parts, and like indicia to denote like signals, in FIGS. 2 and 13.

The first arithmetic circuit 47a has inputs connected to the input-stage voltage command generator circuit 44 and the output-stage voltage command generator circuit 45 for computing the following equation and putting out the difference ΔV:

$$\Delta V = V_{ri} - V_{rc}.$$

The second arithmetic circuit 48a has inputs connected to the rectangular wave generator 46 and the first arithmetic circuit 47a for computing the equations of:

If $\Delta V>0$, then $V_{r1}=V_s-\Delta V$, and $V_{r3}=V_s$;

If $\Delta V=0$, then $V_{r1}=V_s$, and $V_{r3}=V_s$;

and

If $\Delta V<0$, then $V_{r1}=V_s$, and $V_{r3}=V_s+\Delta V$.

The third arithmetic circuit 49a has its connected to the input-stage voltage command generator circuit 44 and the second arithmetic circuit 48a for computing the equation:

$$V_{r2}=V_{r1}-V_{rc}.$$

The switch control command $V_{r1}$, $V_{r2}$ and $V_{r3}$ put out by the two arithmetic circuits 48a and 49a of this converter control circuit 2a in Nonconversion, Stepdown, and Stepup Modes are the same as those designated by the same reference characters in the FIG. 2 converter control circuit 2. It is therefore apparent that this alternative embodiment gains the same advantages as does the first disclosed embodiment of the invention.

Third Form

Figure 14:
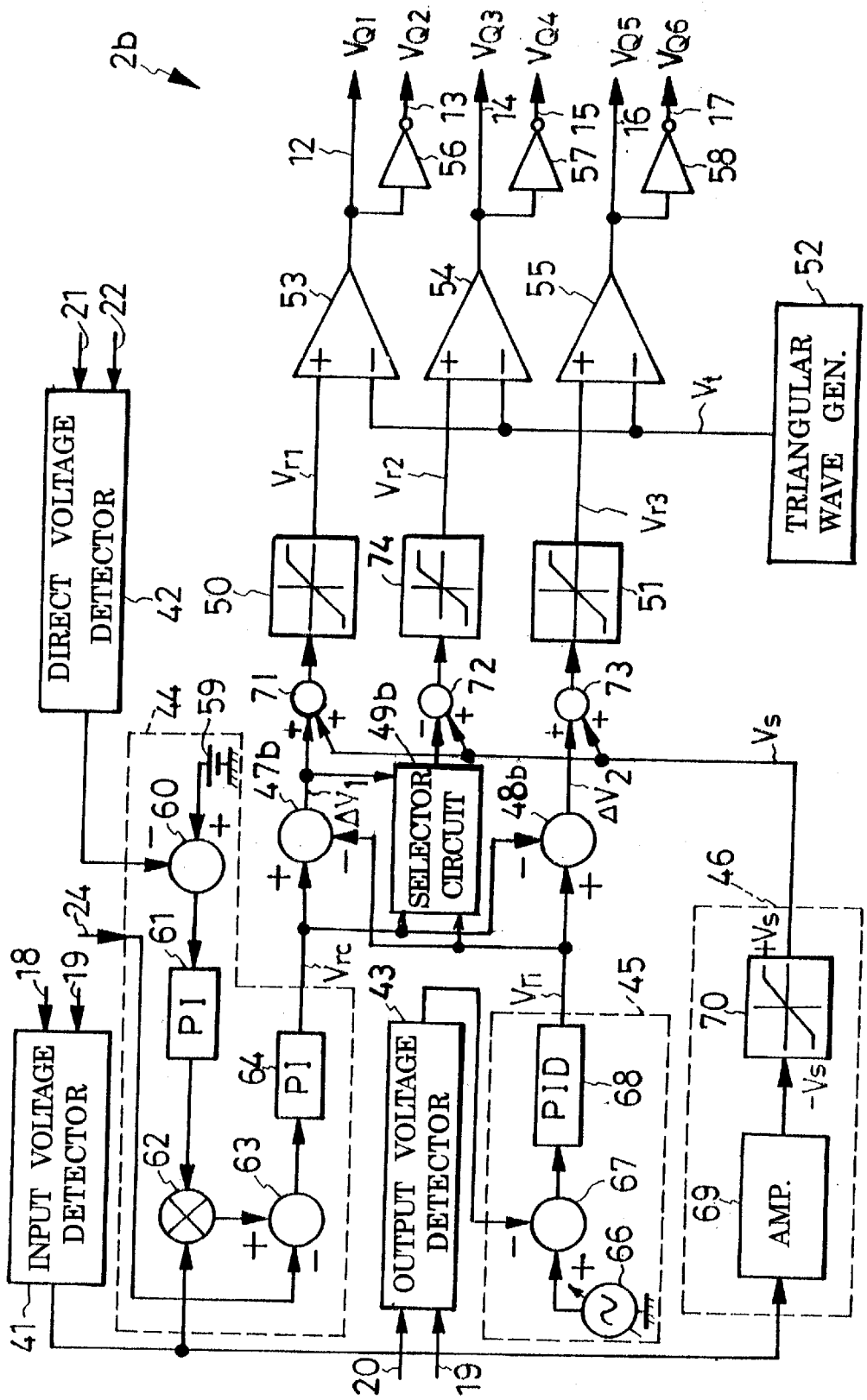
FIG. 14 is also a diagram similar to FIG. 2 but showing a modified converter control circuit for use with the FIG. 1 power converter circuit.

In FIG. 14 is shown another modified converter control circuit 2b, also for use with the FIG. 1 power converter circuit 1. The second modified converter control circuit 2b differs from its FIG. 2 counterpart in having a first and a second arithmetic circuit 47b and 48b and a selector circuit 49b in place of the three arithmetic circuits 47–49, and additionally comprising two adders 71 and 73, a single subtracter 72, and a third limiter 74.

The first arithmetic circuit 47b has inputs connected to the input-stage voltage command generator circuit 44 and the output-stage voltage command generator circuit 45 for computing the following equation and putting out the difference $\Delta V_1$:

$$\Delta V_1 = V_{rc} - V_{ri}.$$

The second arithmetic circuit 48b also has inputs connected to the voltage command generator circuits 44 and 45 for computing the equation:

$$\Delta V_2 = V_{ri} - V_{rc}.$$

The selector circuit 49b has inputs connected to all of the two voltage command generator circuits 44 and 45 and the first arithmetic circuit 47b for making the following choices depending upon the output $\Delta V_1$ from the first arithmetic circuit 47b:

The input-stage voltage command $V_{rc}$ if $\Delta V_1 = 0$;
The input-stage voltage command $V_{rc}$ if $\Delta V_1 > 0$; and
The output-stage voltage command $V_{ri}$ if $\Delta V_1 < 0$.

The adder 71 has its inputs connected to the first arithmetic circuit 47b and the rectangular wave generator 46 for adding the outputs therefrom. The first arithmetic circuit 47b and the adder 71 constitute in combination an equivalence of the FIG. 2 arithmetic circuit 47.

The subtracter 72 has its inputs connected to the selector circuit 49b and the rectangular wave generator 46 for subtracting the subtracter output from the rectangular wave voltage $V_s$, putting out a signal that is substantially equivalent to the output from the FIG. 2 third arithmetic circuit 49. The selector circuit 49b and the subtracter 72 constitute in combination an equivalence of the FIG. 2 third arithmetic circuit 49.

The adder 73 has its inputs connected to the second arithmetic circuit 48b and the rectangular wave generator 46 for adding the outputs therefrom. The arithmetic circuit 48b and the adder 73 constitute in combination an equivalence of the FIG. 2 second arithmetic circuit 48, computing $V_{ri} - V_{rc} + V_s$.

The third limiter 74, also newly introduced in this third embodiment of the invention, is connected between subtracter 72 and second comparator 54 for limiting the subtracter output between the limits $+V_s$ and $-V_s$. The resulting output from the third limiter 74 is the third switch control command $V_{r2}$.

The three switch control command $V_{r1}$, $V_{r2}$ and $V_{r3}$ put out by the three limiters 50, 51 and 74 of the FIG. 14 converter control circuit 2b in Nonconversion, Stepdown, and Stepup Modes are the same as those designated by the same reference characters in the FIG. 2 converter control circuit 2. It is therefore apparent that this embodiment of the invention gains the same advantages as does the first disclosed embodiment.

Fourth Form

Figure 15:
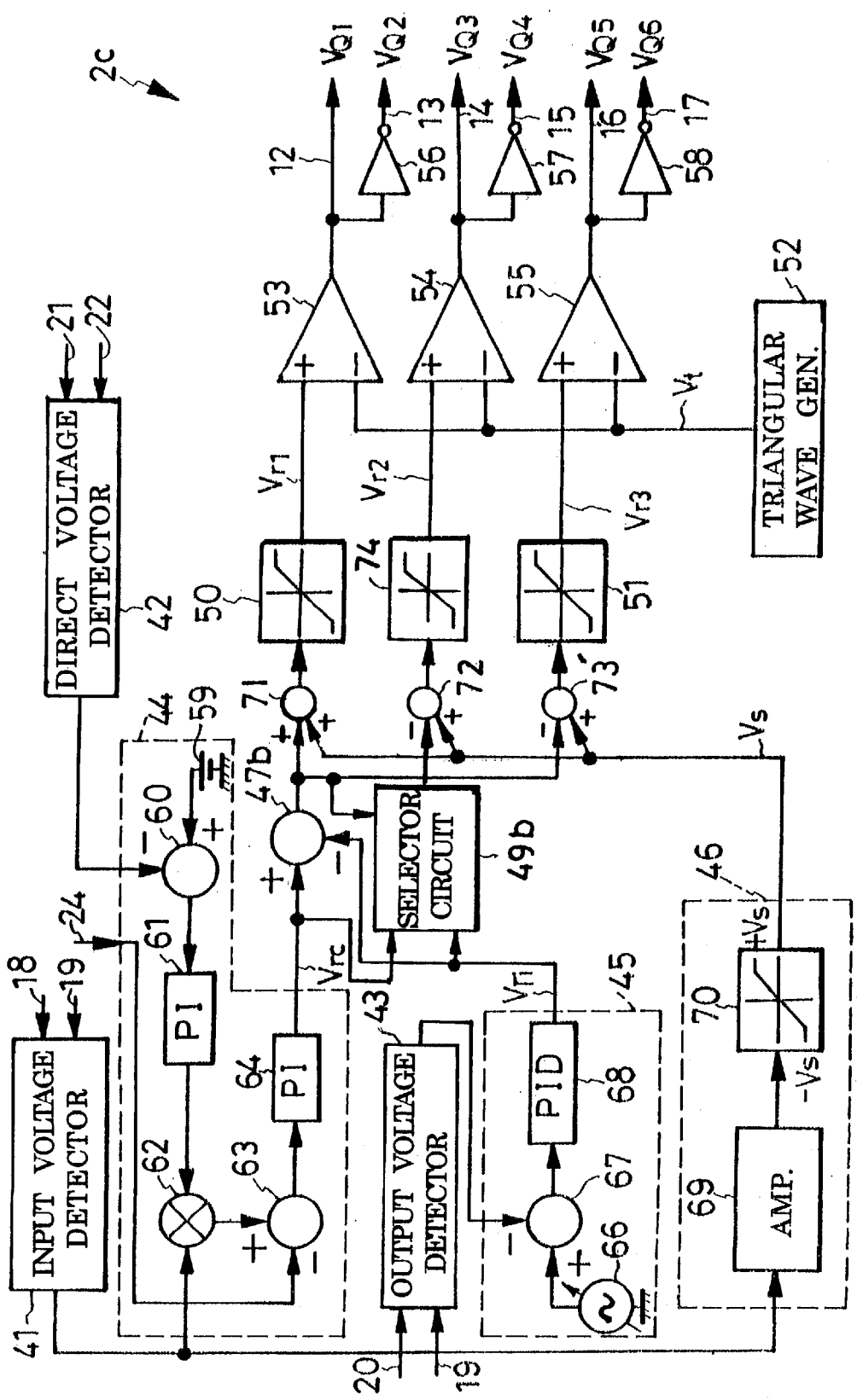
FIG. 15 is also a diagram similar to FIG. 2 but showing another modified converter control circuit for use with the FIG. 1 power converter circuit.

A further modified converter control circuit 2c shown in FIG. 15, which also is for use with the FIG. 1 power converter circuit 1, is akin to the FIG. 14 converter control circuit 2b except for the absence of the second arithmetic circuit 48b and the replacement of the adder 73 by a subtracter 73'.

The subtracter 73' has its two inputs connected to the rectangular wave generator 46 and the first arithmetic circuit 47b for subtracting the first arithmetic circuit output from the rectangular wave voltage $V_s$; that is, $V_s - (V_{rc} - V_{ri}) = V_s - V_{rc} + V_{ri}$. The resulting output from the subtracter 73' is the same as that from the FIG. 14 adder 73.

The three switch control command $V_{r1}$, $V_{r2}$ and $V_{r3}$ put out by the three limiters 50, 51 and 74 of the FIG. 15 converter control circuit 2c in Nonconversion, Stepdown, and Stepup Modes are the same as those designated by the same reference characters in the FIG. 2 converter control circuit 2 or the FIG. 14 converter control circuit 2b. It is therefore apparent that this embodiment of the invention gains the same advantages as do the first and third embodiments.

Fifth Form

Figure 16:
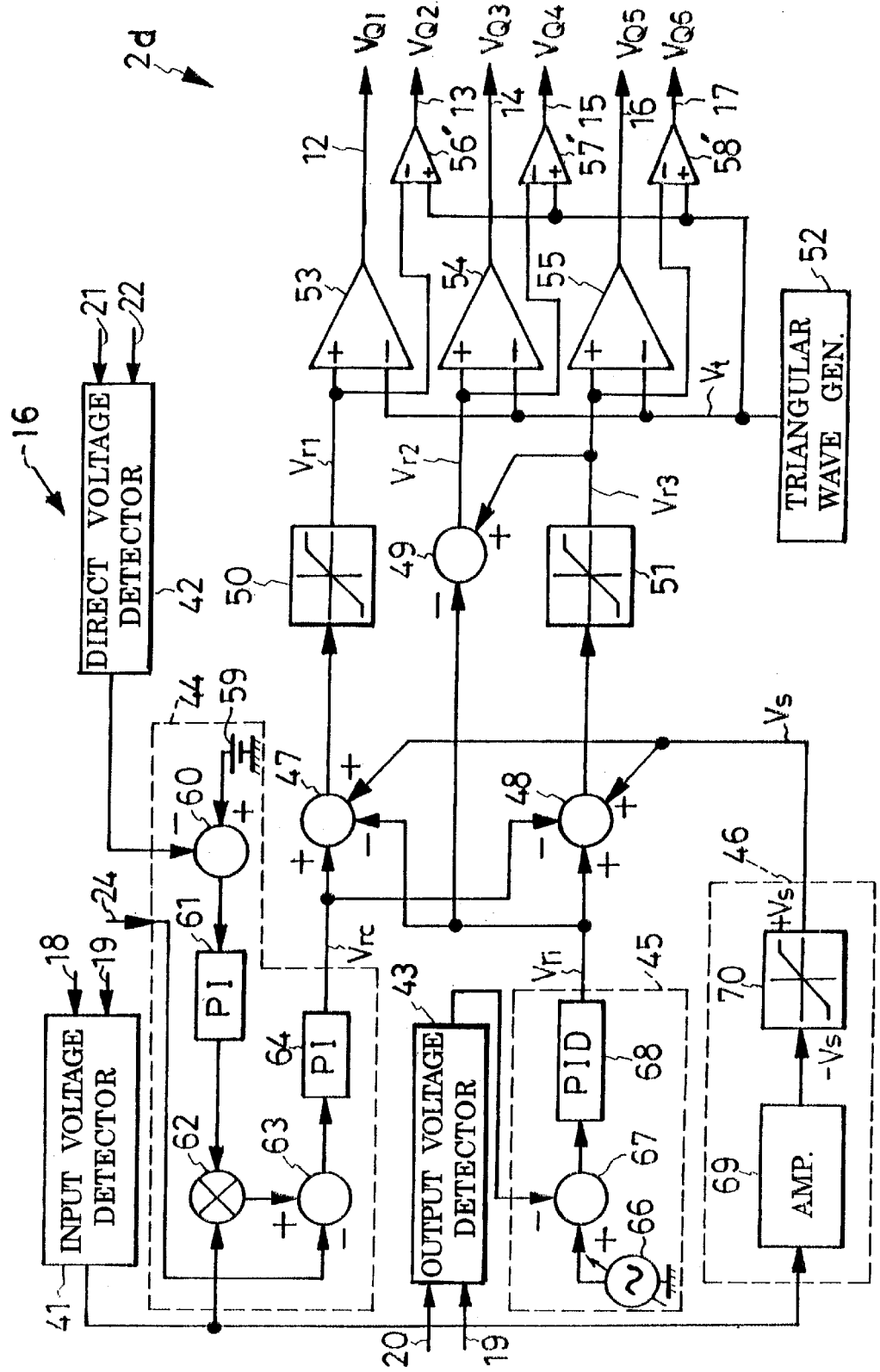
FIG. 16 is also a diagram similar to FIG. 2 but showing yet another modified converter control circuit for use with the FIG. 1 power converter circuit.

Shown in FIG. 16 is a still further modified converter control circuit 2d for use with the FIG. 1 power converter circuit 1. The converter control circuit 2d is similar to the FIG. 2 converter control circuit 2 except for the replacement of the three NOT circuits 56, 57 and 58 by comparators 56', 57' and 58', respectively.

The NOT circuits 56'–58' all have their positive inputs connected to the triangular wave generator 52. The negative input of the first NOT circuit 56' is connected to the first limiter 50, that of the second NOT circuit 57' to the third arithmetic circuit 49, and that of the third NOT circuit 58' to the second limiter 51, thus inputting the three switch control commands $V_{r1}$, $V_{r2}$ and $V_{r3}$, respectively.

Thus, like the NOT circuits 56–58 of the FIG. 2 converter control circuit 2, the comparators 56'–58' put out the switch control signals $V_{Q2}$, $V_{Q4}$ and $V_{Q6}$ which are phase reversals of the switch control signals $V_{Q1}$, $V_{Q3}$ and $V_{Q5}$, respectively, for delivery to the converter switches $Q_1$, $Q_3$ and $Q_5$, FIG. 1, over the lines 13, 15 and 17.

The teachings of FIG. 16 are applicable to the FIGS. 13–15 embodiments as well. Thus, in FIG. 13, for instance, the NOT circuits 56–58 may be each replaced by a comparator.

Possible Modifications

Notwithstanding the foregoing detailed disclosure it is not desired that the present invention be limited by the exact showing of the drawings or by the description thereof. The following, then, is a brief list of possible modifications or alterations of the illustrated embodiments which are all believed to fall within the purview of the instant invention:

1. The various forms 2, 2a, 2b, 2c and 2d of the converter control circuit disclosed herein may each be modified to operate in any selected two of Nonconversion, Stepdown, and Stepup Mode.
2. Digital electronic hardware may be adopted wherever possible for the converter control circuit.
3. Dead time may be provided between the conducting periods of each pair of converter switches $Q_1$ and $Q_2$, $Q_3$ and $Q_4$, or $Q_5$ and $Q_6$ in order to preclude the concurrent conduction of, and consequent shorting between, each pair of such switches.
4. A provision of the three inductors $L_1$–$L_3$ is not essential; instead, only two of them, such as $L_1$ and $L_3$, or $L_2$ and $L_3$, may be employed.
5. The three limiters 50, 51 and 74 could be omitted.
6. The three limiters 50, 51 and 74 as well as the limiter 70 of the rectangular wave generator 46, could have an upper limit of more than 200 volts and a lower limit of less than −200 volts.

7. A plurality of power converter circuits, each constructed as in FIG. 1, could be connected in parallel with each other to provide a multiphase power system.

What is claimed is:

1. A multiway power converter for converting an alternating input voltage from a power supply, comprising:

(a) a first and a second input terminal between which is to be connected a source of an alternating voltage for inputting an alternating input voltage ($V_{in}$);

(b) a first and a second output terminal between which is to be connected a load for applying an alternating output voltage ($V_o$), the second input terminal and the second output terminal being interconnected;

(c) a first and a second switch connected in series with each other and having a junction therebetween which is connected to the first input terminal;

(d) a third and a fourth switch connected in series with each other and in parallel with the serial connection of the first and the second switch, the third and the fourth switch having a junction therebetween which is connected to the interconnected second input terminal and second output terminal;

(e) a fifth and a sixth switch connected in series with each other and in parallel with the serial connections of the first and the second switch and of the third and the fourth switch, the fifth and the sixth switch having a junction therebetween which is connected to the first output terminal;

(f) a capacitor connected in parallel with the serial connections of the first and the second switch and of the third and the fourth switch and of the fifth and the sixth switch;

(g) at least two inductors connected in positions selected from among a first position between the first input terminal and the junction between the first and the second switch, a second position between the first output terminal and the junction between the fifth and the sixth switch, and a third position between the interconnected second input terminal and second output terminal and the junction between the third and the fourth switch; and (h) a control circuit comprising at least any two of: (i) first control means for making on-off control of the first and the second and the fifth and the sixth switch at the frequency of the input voltage ($V_{in}$), and of the third and the fourth switch at a frequency higher than that of the input voltage, in nonconversion mode in which a first voltage ($V_{in}$ or $V_{con}$) between the first input terminal or the junction between the first and the second switch and the interconnected second input terminal and second output terminal is approximately equal to a second voltage ($V_o$ or $V_{inv}$) between the first output terminal or the junction between the fifth and the sixth switch and the interconnected second input terminal and second output terminal; (ii) second control means for making on-off control of the first and the second switch at the frequency of the input voltage ($V_{in}$), and of the third and the fourth and the fifth and the sixth switch at a frequency higher than that of the input voltage, in stepdown mode in which the second voltage ($V_o$ or $V_{inv}$) is lower than the first voltage ($V_{in}$ or $V_{conv}$); and (iii) third control means for making on-off control of the first and the second and the third and the fourth switch at a frequency higher than that of the input voltage ($V_{in}$), and of the fifth and the sixth switch at the frequency of the input voltage, in stepup mode in which the second output voltage ($V_0$ or $V_{inv}$) is higher than the first voltage ($V_{in}$ or $V_{conv}$).

2. The multiway power converter of claim 1 wherein the control circuit comprises:

(a) a first voltage command generator circuit for generating in synchronism with the input voltage ($V_{in}$) a first voltage command ($V_{rc}$) for setting up a desired first voltage ($V_{conv}$) between the junction between the first and the second switch and the interconnected second input terminal and second output terminal;

(b) a second voltage command generator circuit for generating in synchronism with the input voltage ($V_{in}$) a second voltage command ($V_{ri}$) for setting up a desired second voltage ($V_{inv}$) between the junction between the fifth and the sixth switch and the interconnected second input terminal and second output terminal;

(c) a rectangular wave generator for generating a rectangular wave voltage ($V_s$) at the same frequency as the input voltage ($V_{in}$);

(d) arithmetic means connected to the first and the second voltage command generator circuit and the rectangular wave generator for providing a first value ($V_{r1}$) and a second value ($V_{r3}$) and a third value ($V_{r2}$) by computing equations of:

$$V_{r1}=V_{rc}-V_{r1}+V_s,$$

$$V_{r3}=V_{ri}-V_{rc}+V_s,$$

and $$V_{r2}=V_{r3}-V_{ri},\ V_{r2}=V_s-V_{rc},\ \text{or}\ V_{r2}=V_s-V_{ri};$$

and (e) switch control means connected between the arithmetic means and the first to sixth switches for making on-off control of the latter by switch control signals ($V_{Q1}$–$V_{Q6}$) formed from the first to third values ($V_{r1}$–$V_{r3}$) supplied from the former.

3. The multiway power converter of claim 2 wherein the switch control means of the control circuit comprises:

(a) a wave generator for generating a periodic wave ($V_t$) at a frequency higher than that of the input voltage ($V_{in}$);

(b) a first comparator having inputs connected to the arithmetic means and the wave generator for providing a first binary switch control signal ($V_{Q1}$) which has a first voltage level when the first value ($V_{r1}$) is of greater magnitude than the periodic wave ($V_t$), and a second voltage level when the first value is of less magnitude than the period wave, the first comparator having an output connected to the first switch for on-off control thereof by the first switch control signal ($V_{Q1}$);

(c) a first inverter connected between the first comparator and the second switch for on-off control of the latter by a second switch control signal ($V_{Q2}$) which is a phase reversal of the first switch control signal ($V_{Q1}$);

(d) a second comparator having inputs connected to the arithmetic means and the wave generator for providing a third binary switch control signal ($V_{Q3}$) which has a first voltage level when the third value ($V_{r2}$) is of greater magnitude than the periodic wave ($V_t$), and a second voltage level when the third value is of less magnitude than the period wave, the second comparator having an output connected to the third switch for on-off control thereof by the third switch control signal ($V_{Q3}$);

(e) a second inverter connected between the second comparator and the fourth switch for on-off control of the latter by a fourth switch control signal ($V_{Q4}$) which is a phase reversal of the third switch control signal ($V_{Q3}$);

(f) a third comparator having inputs connected to the arithmetic means and the wave generator for providing a fifth binary switch control signal ($V_{Q5}$) which has a first voltage level when the second value ($V_{r3}$) is of greater magnitude than the periodic wave ($V_t$), and a second voltage level when the second value is of less magnitude than the period wave, the third comparator having an output connected to the fifth switch for on-off control thereof by the fifth switch control signal ($V_{Q5}$); and (g) a third inverter connected between the third comparator and the sixth switch for on-off control of the latter by a sixth switch control signal ($V_{Q6}$) which is a phase reversal of the fifth switch control signal ($V_{Q5}$).

4. The multiway power converter of claim 2 wherein the switch control means of the control circuit comprises:

(a) a wave generator for generating a periodic wave ($V_t$) at a frequency higher than that of the input voltage ($V_{in}$);

(b) a first comparator having inputs connected to the arithmetic means and the wave generator for providing a first binary switch control signal ($V_{Q1}$) which has a first voltage level when the first value ($V_{r1}$) is of greater magnitude than the periodic wave ($V_t$), and a second voltage level when the first value is of less magnitude than the period wave, the first comparator having an output connected to the first switch for on-off control thereof by the first switch control signal ($V_{Q1}$);

(c) a second comparator having inputs connected to the arithmetic means and the wave generator for providing a second binary switch control signal ($V_{Q2}$) which has a first voltage level when the first value ($V_{r1}$) is of less magnitude than the periodic wave ($V_t$), and a second voltage level when the first value is of greater magnitude than the period wave, the second comparator having an output connected to the second switch for on-off control thereof by the second switch control signal ($V_{Q2}$);

(d) a third comparator having inputs connected to the arithmetic means and the wave generator for providing a third binary switch control signal ($V_{Q3}$) which has a first voltage level when the third value ($V_{r2}$) is of greater magnitude than the periodic wave ($V_t$), and a second voltage level when the third value is of less magnitude than the period wave, the third comparator having an output connected to the third switch for on-off control thereof by the third switch control signal ($V_{Q3}$);

(e) a fourth comparator having inputs connected to the arithmetic means and the wave generator for providing a fourth binary switch control signal ($V_{Q4}$) which has a first voltage level when the third value ($V_{r2}$) is of less magnitude than the periodic wave ($V_t$), and a second voltage level when the third value is of greater magnitude than the period wave, the fourth comparator having an output connected to the fourth switch for on-off control thereof by the fourth switch control signal ($V_{Q4}$);

(f) a fifth comparator having inputs connected to the arithmetic means and the wave generator for providing a fifth binary switch control signal ($V_{Q5}$) which has a first voltage level when the second value ($V_{r3}$) is of greater magnitude than the periodic wave ($V_t$), and a second voltage level when the second value is of less magnitude than the period wave, the third comparator having an output connected to the fifth switch for on-off control thereof by the fifth switch control signal ($V_{Q5}$); and (g) a sixth comparator having inputs connected to the arithmetic means and the wave generator for providing a sixth binary switch control signal ($V_{Q6}$) which has a first voltage level when the second value ($V_{r3}$) is of less magnitude than the periodic wave ($V_t$), and a second voltage level when the second value is of greater magnitude than the period wave, the sixth comparator having an output connected to the sixth switch for on-off control thereof by the sixth switch control signal ($V_{Q5}$).

5. The multiway power converter of claim 2 wherein the arithmetic means of the control circuit comprises:

(a) a first arithmetic circuit connected to the first and the second voltage command generator circuit and the rectangular wave generator for putting out the first value ($V_{r1}$) by computing $V_{rc} - V_{ri} + V_s$;

(b) a second arithmetic circuit connected to the first and the second voltage command generator circuit and the rectangular wave generator for putting out the second value ($V_{r3}$) by computing $V_{ri} - V_{rc} + V_s$; and (c) a third arithmetic circuit connected to the second voltage command generator circuit and the second arithmetic circuit for putting out the third value ($V_{r2}$) by computing $V_{r3} - V_{ri}$.

6. The multiway power converter of claim 5 wherein the control circuit further comprises:

(a) a first limiter connected to the first arithmetic circuit for limiting the first value output therefrom between an upper limit that is equal to or greater than a maximum value of the rectangular wave voltage ($V_s$), and a lower limit that is equal to or less than a minimum value of the rectangular wave voltage; and (b) a second limiter connected to the second arithmetic circuit for limiting the second value output therefrom between an upper limit that is equal to or greater than a maximum value of the rectangular wave voltage ($V_s$), and a lower limit that is equal to or less than a minimum value of the rectangular wave voltage.

7. The multiway power converter of claim 2 wherein the arithmetic means of the control circuit comprises:

(a) a first arithmetic circuit connected to the first and the second voltage command generator circuit for computing the equation:

$$\Delta V = V_{ri} - V_{rc}$$

and for putting out the difference $\Delta V$;

(b) a second arithmetic circuit connected to the first arithmetic circuit and the rectangular wave generator for computing the equations of:

$$V_{r1} = V_s - \Delta V, \text{ and } V_{r3} = V_s, \text{ if } \Delta V > 0,$$

$$V_{r1} = V_s, \text{ and } V_{r3} = V_s, \text{ if } \Delta V = 0,$$

and $V_{r1}=V_s$, and $V_{r3}=V_s+\Delta V$, if $\Delta V<0$;

and (c) a third arithmetic circuit connected to the first voltage command generator circuit and the second arithmetic circuit for computing the equation:

$V_{r2}=V_{r1}-V_{rc}$.

8. The multiway power converter of claim 2 wherein the arithmetic means of the control circuit comprises:
   (a) a first arithmetic circuit connected to the first and the second voltage command generator circuit for computing the equation:

$\Delta V_1=V_{rc}-V_{ri}$ and for putting out the difference $\Delta V_1$;
   (b) a second arithmetic circuit connected to the first and the second voltage command generator circuit for computing the difference between the first voltage command ($V_{rc}$) and the second voltage command ($V_{ri}$);
   (c) a selector circuit connected to the first and the second voltage command generator circuit for putting out the first voltage command ($V_{rc}$) when the difference $\Delta V_1$ is not less than zero, and the second voltage command ($V_{ri}$) when the difference $\Delta V_1$ is less than zero;
   (d) a first adder connected to the first arithmetic circuit and the rectangular wave generator for putting out the first value ($V_{r1}$) by computing the equation:

$V_{r1}=V_s+(V_{rc}-V_{ri})$;

(e) a second adder connected to the second arithmetic circuit and the rectangular wave generator for putting out the second value ($V_{r3}$) by computing the equation:

$V_{r3}=V_s+(V_{ri}-V_{rc})$;

and
   (f) a subtracter connected to the selector circuit and the rectangular wave generator for putting out the third value ($V_{r2}$) by computing the equation:

$V_{r2}=V_s-V_{rc}$, or $V_{r2}=V_sV_{ri}$.

9. The multiway power converter of claim 8 wherein the control circuit further comprises:
   (a) a first limiter connected to the first adder for limiting the output therefrom between an upper limit that is equal to or greater than a maximum value of the rectangular wave voltage ($V_s$), and a lower limit that is equal to or less than a minimum value of the rectangular wave voltage;
   (b) a second limiter connected to the second adder for limiting the output therefrom between an upper limit that is equal to or greater than a maximum value of the rectangular wave voltage ($V_s$), and a lower limit that is equal to or less than a minimum value of the rectangular wave voltage; and
   (c) a third limiter connected to the subtracter for limiting the output therefrom between an upper limit that is equal to or greater than a maximum value of the rectangular wave voltage ($V_s$), and a lower limit that is equal to or less than a minimum value of the rectangular wave voltage.

10. The multiway power converter of claim 2 wherein the arithmetic means of the control circuit comprises:
    (a) a first arithmetic circuit connected to the first and the second voltage command generator circuit for computing the equation:

$\Delta V_1=V_{rc}-V_{ri}$ and for putting out the difference $\Delta V_1$;
    (b) a selector circuit connected to the first and the second voltage command generator circuit and the arithmetic circuit for putting out the first voltage command ($V_{rc}$) when the difference $\Delta V_1$ is not less than zero, and the second voltage command ($V_{ri}$) when the difference $\Delta V_1$ is less than zero;
    (c) an adder connected to the arithmetic circuit and the rectangular wave generator for putting out the first value ($V_{r1}$) by computing the equation:

$V_{r1}=V_s+(V_{rc}-V_{ri})$;

(d) a first subtracter connected to the arithmetic circuit and the rectangular wave generator for putting out the second value ($V_{r3}$) by computing the equation:

$V_{r3}=V_s-(V_{rc}-V_{ri})$;

and
    (f) a second subtracter connected to the selector circuit and the rectangular wave generator for putting out the third value ($V_{r2}$) by computing the equation:

$V_{r2}=V_s-V_{rc}$, or $V_{r2}=V_s-V_{ri}$.

11. The multiway power converter of claim 10 wherein the control circuit further comprises:
    (a) a first limiter connected to the adder for limiting the output therefrom between an upper limit that is equal to or greater than a maximum value of the rectangular wave voltage ($V_s$), and a lower limit that is equal to or less than a minimum value of the rectangular wave voltage;
    (b) a second limiter connected to the first subtracter for limiting the output therefrom between an upper limit that is equal to or greater than a maximum value of the rectangular wave voltage ($V_s$), and a lower limit that is equal to or less than a minimum value of the rectangular wave voltage; and
    (c) a third limiter connected to the second subtracter for limiting the output therefrom between an upper limit that is equal to or greater than a maximum value of the rectangular wave voltage ($V_s$), and a lower limit that is equal to or less than a minimum value of the rectangular wave voltage.

12. The multiway power converter of claim 2 wherein the first voltage command generator circuit of the control circuit comprises:
    (a) an input voltage detector circuit connected to the first and the second input terminal for detecting the input voltage ($V_{in}$);
    (b) a capacitor voltage detector circuit connected to the capacitor for detecting a direct voltage across the same;
    (c) a current detector circuit connected to the first input terminal for providing a voltage output in proportion with a current flowing through the first input terminal;

(d) a source of a referential direct voltage;

(e) a first subtracter having inputs connected to the capacitor voltage detector circuit and the voltage source for providing an output indicative of a difference between the voltage across the capacitor and the referential voltage;

(f) a multiplier having inputs connected to the input voltage detector circuit and the first subtracter for providing an output indicative of the product of the input voltage and the output from the first subtracter; and (g) a second subtracter having inputs connected to the current detector circuit and the multiplier for putting out the first voltage command ($V_{rc}$) by subtracting the output from the current detector circuit from the output from the multiplier.

13. The multiway power converter of claim 2 wherein the second voltage command generator circuit of the control circuit comprises:

(a) a referential output voltage command generator for providing a command indicative of a referential output voltage;

(b) an output voltage detector circuit connected to the first and the second output terminal for detecting the actual output voltage (Vo); and (c) a subtracter having inputs connected to the referential output voltage command generator and the output voltage detector circuit for providing the second voltage command (Vri) indicative of a difference between the referential output voltage and the actual output voltage.

14. The multiway power converter of claim 13 wherein the referential output voltage command generator of the second voltage command generator circuit is capable of putting out any selected one of a plurality of different referential output voltage commands.

* * * * *